(12) United States Patent
Beaver

(10) Patent No.: US 6,428,078 B1
(45) Date of Patent: Aug. 6, 2002

(54) MOUNTING ASSEMBLY FOR VEHICLE SUNSHADE AND METHOD FOR INSTALLING SAME IN A VEHICLE

(75) Inventor: Jeffrey L. Beaver, Indianapolis, IN (US)

(73) Assignee: Crotty Corporation, Quincy, MI (US)

( * ) Notice: Subject to any disclaimer, the term of this patent is extended or adjusted under 35 U.S.C. 154(b) by 0 days.

(21) Appl. No.: 09/757,176

(22) Filed: Jan. 9, 2001

(51) Int. Cl.$^7$ ................................................ B60J 3/00
(52) U.S. Cl. ..................... 296/97.9; 296/97.13
(58) Field of Search .............................. 296/97.9, 97.13

(56) References Cited

U.S. PATENT DOCUMENTS

| | | | |
|---|---|---|---|
| 3,017,217 A | * | 1/1962 | Keating |
| 5,031,954 A | | 7/1991 | Peterson et al. |
| 5,056,853 A | * | 10/1991 | Van Order |
| 5,236,240 A | * | 8/1993 | Burns et al. |
| 5,499,854 A | | 3/1996 | Crotty, III et al. |
| 5,697,140 A | | 12/1997 | Crotty, III et al. |
| 5,857,728 A | | 1/1999 | Crotty, III |
| 6,068,323 A | | 5/2000 | Brown et al. |
| 6,250,708 B1 | * | 6/2001 | Kurachi |

* cited by examiner

Primary Examiner—Stephen T. Gordon
Assistant Examiner—Scott Carpenter
(74) Attorney, Agent, or Firm—Rader, Fishman & Grauer, PLLC

(57) ABSTRACT

A mounting assembly for installing a rotatable shaft, such as used with a vehicle visor, to an apertured panel. The mounting assembly includes an elbow rotatable within an inner bracket that is held within an outer bracket. One or more resilient locking arms of the inner bracket extend through openings in the outer bracket, and a catch portion of each locking arm overlays the panel distal surface to resist withdrawal of an installed mounting assembly. Each locking arm is configured such that when the inner bracket is moved axially relative to the outer bracket, the locking arm catch portion is radially retracted clear of the panel distal surface to allow proximal withdrawal of the installed mounting assembly. A method of mounting a visor to a vehicle is also disclosed.

30 Claims, 26 Drawing Sheets

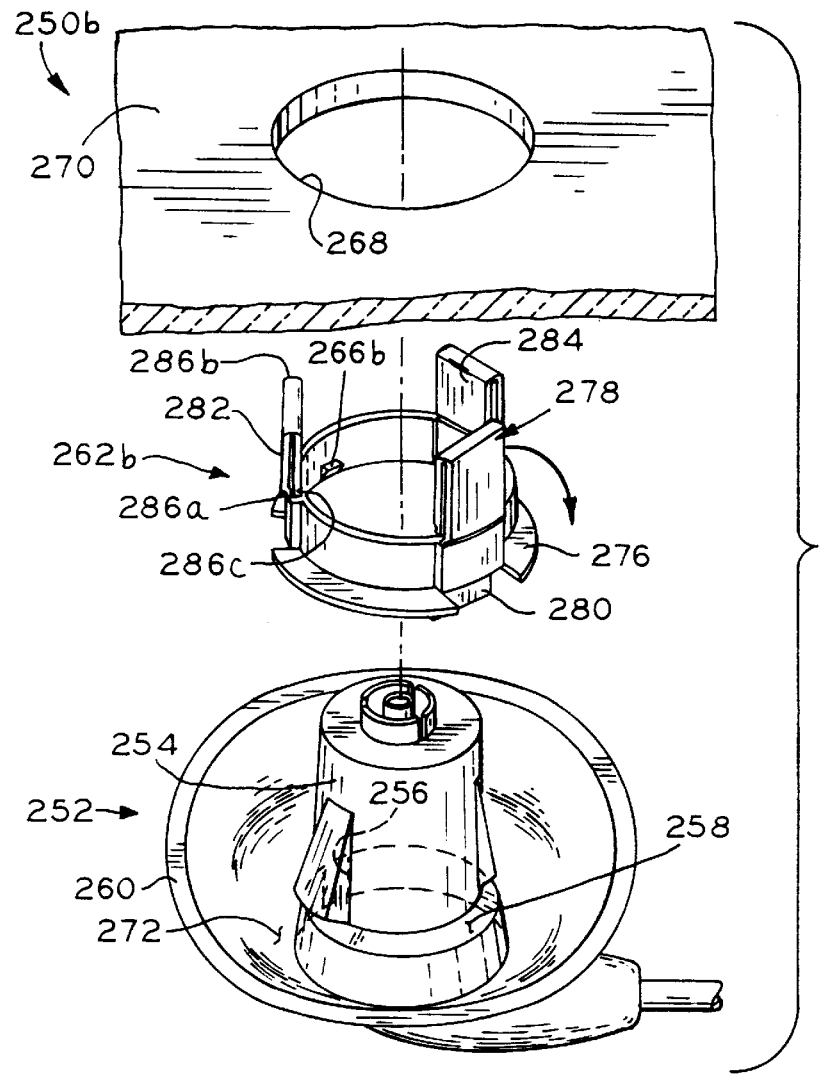
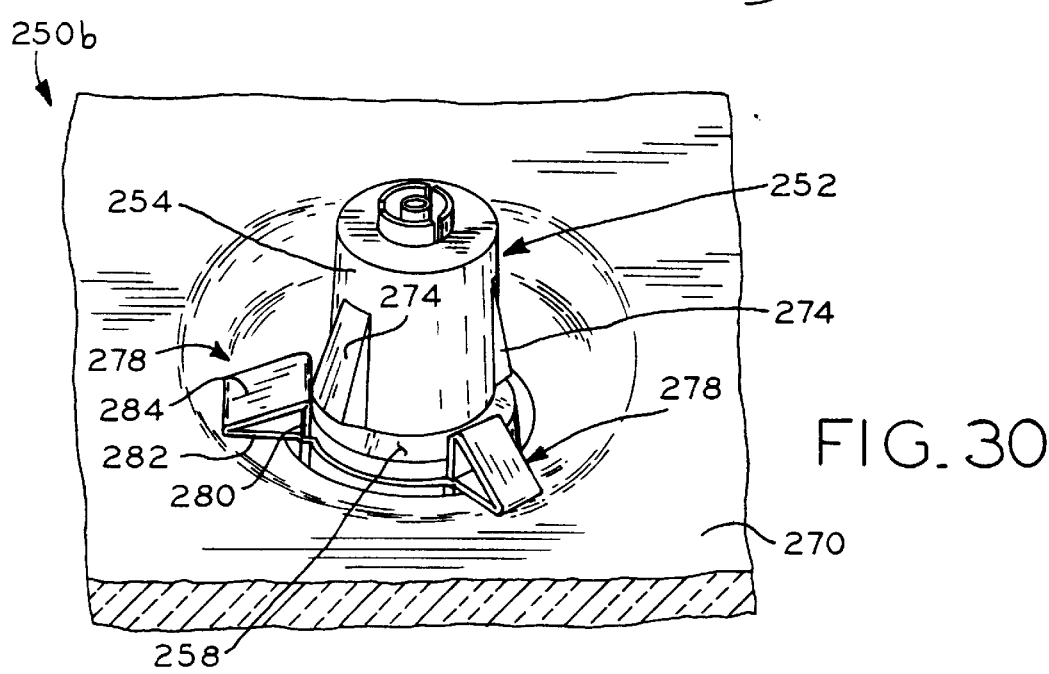

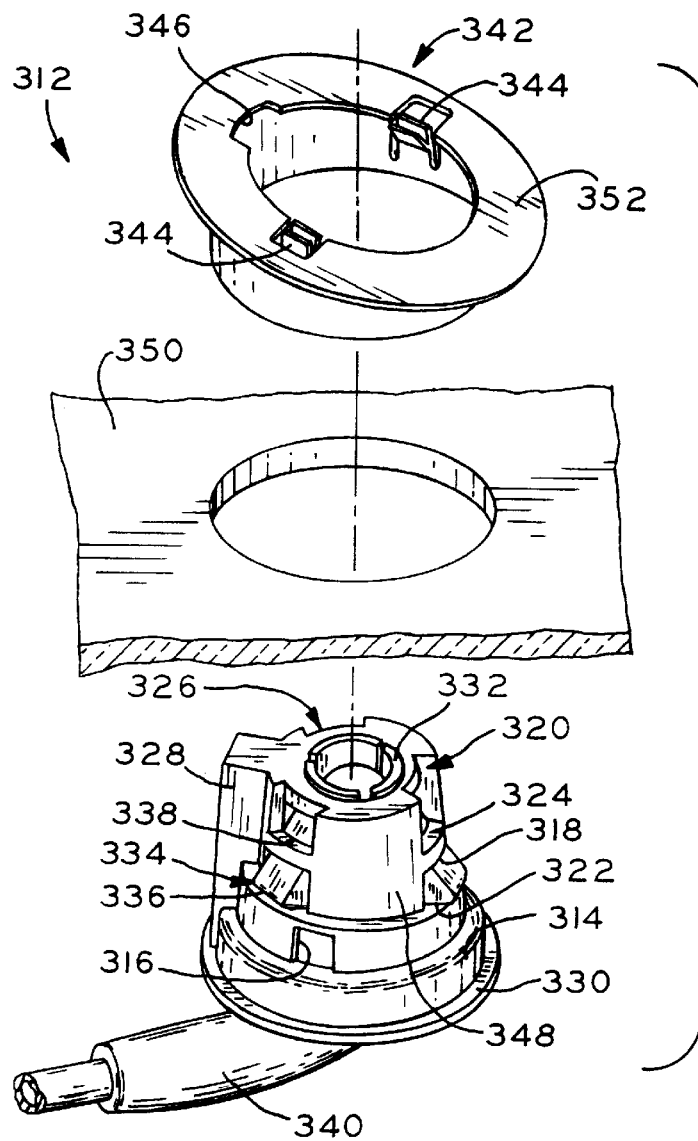
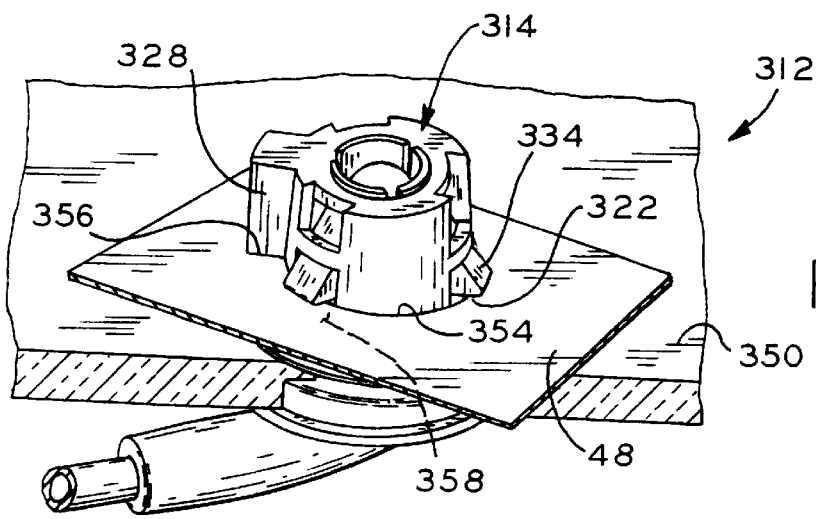

MOUNTING ASSEMBLY FOR VEHICLE SUNSHADE AND METHOD FOR INSTALLING SAME IN A VEHICLE

FIELD OF THE INVENTION

The present invention relates to assemblies used to mount rotatable shafts, such as used with visors within motor vehicles, and, in particular, to a mounting assembly that allows a visor with a rotatable shaft to be installed in a vehicle without the use of tools or additional fasteners.

BACKGROUND OF THE INVENTION

Sunshades or visors for vehicles are generally mounted near an upper corner of the windshield. Sunvisors typically include a visor blade which may be rotated about a horizontal axis between a storage position adjacent the vehicle headliner and a use position adjacent, for example, the windshield of the vehicle. Conventional sunvisors are also typically rotatable about a generally vertical axis to permit the visor blade to be positioned alongside either the windshield or the side window. A multitude of visor mounting assemblies known in the art utilize screws to attach the assembly to the sheet metal panel that forms the vehicle roof, which assembly is often so attached after a headliner has been installed in the vehicle to upholster the interior surface of the vehicle roof.

To facilitate the process of installing a sunvisor within a vehicle during manufacture, a variety of screwless visor mounting assemblies previously have been developed, which assemblies fit within one or more apertures provided in the sheet metal roof panel. Representative mounting assemblies include those disclosed in U.S. Pat. Nos. 5,031,954, 5,499,854, 5,697,140, 5,857,728, and 6,068,323, the disclosure of each of these patents being expressly incorporated herein by reference. While typically effective to mount the sunvisor with lower labor costs than assemblies requiring fastening screws and the like, screwless visor mounting assemblies are not without their shortcomings. For example, to appropriately complete the installation process, typically these assemblies have a component which must be rotated after its insertion within the aperture of the panel. In some cases, whether due to over rotation or under rotation of that component, an improper relative rotation occurs resulting in an incorrect installation of the mounting assembly, and therefore the visor, in the vehicle.

Thus, it would be desirable to provide a mounting assembly which overcomes these and other shortcomings of the prior art.

SUMMARY OF THE INVENTION

The present invention provides a mounting assembly capable of being installed in a blind hole to support a rotatable shaft, such as used with a vehicle visor, without additional fasteners or additional locking operations. The mounting assembly also may be integrated into a modular headliner system in which the mounting assembly is initially secured to a headliner, and then when used to mount a visor secures the headliner in the vehicle.

In one form thereof, the invention comprises a mounting assembly for mounting a visor to a vehicle panel. The vehicle panel has an aperture, a distal surface, and a proximal surface. The assembly includes an elbow adapted to be connected to a visor. An inner bracket is provided which defines a first opening within which the elbow is received. The elbow is rotatable within the inner bracket opening about an axis extending in an axial direction of the inner bracket. An outer bracket defines a second opening within which the inner bracket is received. The outer bracket includes at least one surface region for operable engagement with the panel proximal surface. The outer bracket includes a third opening. A first catch and a second catch are associated with at least one of the inner bracket and the outer bracket. Each of the first and second catches are adapted to operably engage a panel distal surface to resist withdrawal of the mounting assembly when installed in the panel aperture. At least one of the first catch and second catch comprise a panel catching portion of a locking arm. The panel catching portion is radially movable relative to the inner bracket between an extended position and a retracted position. The panel catching portion is biased radially outwardly through the third opening in the outer bracket toward the extended arrangement at which the panel catching portion and the at least one surface region of the outer bracket axially capture the panel therebetween to hold the mounting assembly in the aperture of the panel.

The invention also comprises a mounting assembly for mounting a component to a panel. The panel has an aperture, a distal surface, and a proximal surface. The assembly comprises an inner bracket adapted to be operably attached to the component. An outer bracket defines a first opening within which the inner bracket is received. The inner bracket is movable within the outer bracket opening in an axially direction between first and second axial positions. A first catch and a second catch are associated with at least one of the inner bracket and the outer bracket. Each of the first and second catches are adapted to operably engage the panel distal surface when the inner bracket is disposed in the first axial position to resist withdrawal of the mounting assembly when installed in the panel aperture. At least one of the first catch and second catch comprise a panel catching portion of a locking arm. The locking arm is connected to one of the inner bracket and the outer bracket. The other of the inner bracket and outer bracket includes a ramp engaging surface. The locking arm includes a ramped region. The panel catching portion is biased radially outwardly from a retracted position to an extended position. When the inner bracket is disposed in the first axial position and the mounting assembly is located in an insulation axial position within the panel aperture, the panel catching portion extends beyond the expanse of the panel aperture in the extended arrangement, so as to overlay the panel distal surface and resist proximal withdrawal of the mounting assembly. When the inner bracket is moved radially relative to the outer bracket from the first axial position to the second axial position, the ramped region slides along the ramp engaging surface to radially shift the panel catching portion from the extended position to the retracted position. The panel catching portion fits through the panel aperture when in the retracted arrangement to allow proximal withdrawal of the mounting assembly from the aperture in the panel.

The invention still further comprises, in one form thereof, a mounting assembly for mounting a vehicle visor to an aperture panel. The assembly comprises an elbow attachable to the visor and an inner bracket defining an opening within which the elbow is received. The elbow is rotatable within the inner bracket opening about an axial extending in an axial direction. An outer bracket defines an opening in which the inner bracket is received. Means are provided for attaching the amounting assembly to the panel, the attaching means including at least one resilient locking arm biased to a radially outward position and engagement with the panel. Means are provided for shifting said at least one resilient locking arm from the radially outward position to a radially retracted position responsive to movement in the axial direction of the inner bracket from a first position to a second position relative to the outer bracket. At least one resilient locking arm is disengaged from the panel when in the radially retracted position to allow withdrawal of the mounting assembly from the aperture panel.

The invention still further comprises a method of attaching a visor to a vehicle. The method comprises the steps of providing an aperture vehicle panel and providing a mounting assembly including an outer bracket, an inner bracket, and an elbow attachable to the visor. The inner bracket includes at least one resilient locking arm radially movable between a retracted position and an extended position. The method it further comprises inserting the elbow into an interior hollow of the inner bracket which permits rotation of the elbow within the inner bracket, inserting the inner bracket into an interior hollow of the outer bracket until at least one resilient locking arm automatically moves to the extended position through an opening in the outer bracket. After insertion of the inner bracket into the outer bracket interior hollow, the outer bracket is inserted in an axial direction into the aperture vehicle panel whereby the at least one resilient locking arm first engages a panel during the axial insertion to be shifted radially inwardly thereby, and then automatically moves from the extended position to a position over a distal surface to the panel to resist withdrawal.

In further form thereof, a subassembly for mounting within a vehicle is provided, including a headliner having an aperture therein; a visor mounting assembly including an outer bracket and an inner bracket received within the outer bracket, the outer bracket including a skirt portion and a tower portion, the tower portion inserted within the aperture and having at least one opening therein, the inner bracket including at least one locking arm, each locking arm extending through a respective opening; and a locking member attached to the tower portion intermediate the at least one locking arm and the skirt portion, the headliner captured between the locking member and the skirt portion.

One advantage of the present invention is that a mounting assembly for a rotatable shaft, such as employed in a vehicle visor, is provided which can be easily installed and then removed for service.

Another advantage of the present invention is that a mounting assembly is provided which is relatively inexpensive to manufacture and assemble.

Another advantage of the inventive mounting assembly is that it may provide an audible and tactile feedback to an installer to aid in determining proper installation, thus reducing the likelihood of incurring lost time and the use of additional materials in replacing improperly installed units.

Another advantage of the inventive mounting assembly is that it may be installed by hand without the need for auxiliary tools or additional fasteners.

Still another advantage of the inventive mounting assembly is that it may be supplied as part of a modular system for mounting a headliner.

Still another advantage of the inventive mounting assembly is that at least some of the components may be used in both right or left hand applications, thereby maintaining the number of unique component parts required for a given vehicle to a minimum.

Yet another advantage of the inventive mounting assembly is that it includes an internal wireway which, during installation, helps to protect electrical wires associated with many vehicle visors.

Still other advantages of the inventive mounting assembly are that it mounts to irregular and/or inclined surfaces, can be installed and removed and reinstalled without the loss of its holding power, and can compensate for variations in the panel aperture size and thickness of the panel to which it mounts.

BRIEF DESCRIPTION OF THE FIGURES

The above-mentioned and other advantages and objects of this invention, and the manner of attaining them, will become more apparent and the invention itself will be better understood by reference to the following descriptions of embodiments of the invention taken in conjunction with the accompanying drawings, wherein:

FIG. 29 is an exploded view of another mounting assembly of the present invention, a headliner, and a second locking ring;

FIG. 30 is a partial perspective view of the mounting assembly of FIG. 29, showing the headliner attached thereto by the second locking ring;

FIG. 35 is an exploded view of another mounting assembly of the present invention, a headliner, and a locking ring, the outer bracket of the mounting assembly having a key portion;

FIG. 36 is a partial perspective view of the mounting assembly of FIG. 35, shown attached to a panel;

Figure 1:
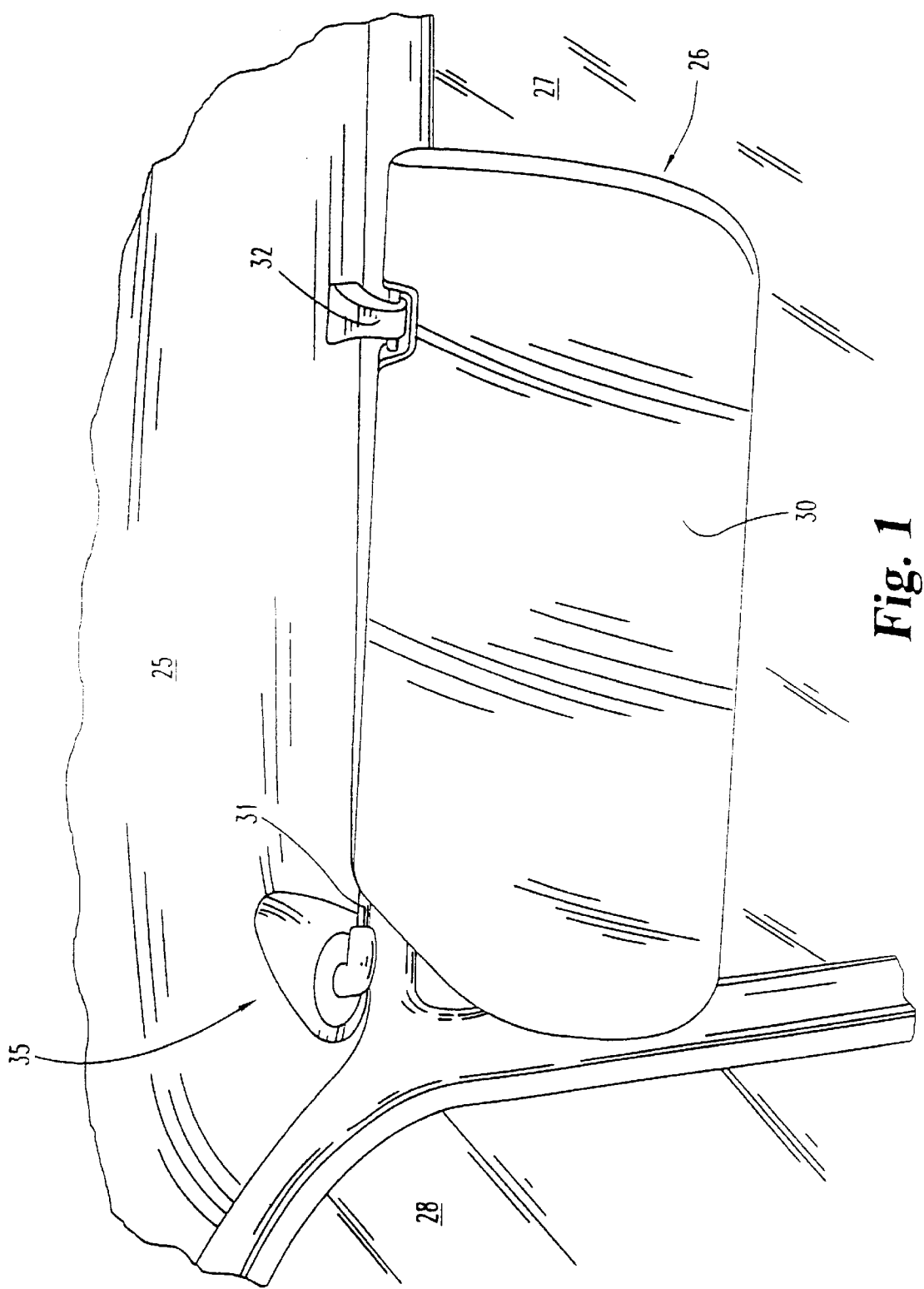
FIG. 1 is a diagrammatic view of a visor shown operationally installed in a vehicle via one form of a mounting assembly of the present invention.

Corresponding reference characters indicate corresponding parts throughout the several views. Although the drawings represent embodiments of the invention, the drawings are not necessarily to scale and certain features may be exaggerated or omitted in order to better illustrate and explain the present invention.

DESCRIPTION OF THE PREFERRED EMBODIMENTS

The embodiments disclosed below are not intended to be exhaustive or limit the invention to the precise forms disclosed in the following detailed description. Rather, the embodiments are chosen and described so that others skilled in the art may better utilize the teachings of the invention.

Referring now to FIG. 1, there is shown a mounting assembly of the present invention, generally designated 35, being employed to install a sunshade or visor to the hidden sheet metal roof interior panel of a vehicle such as an automobile. As is conventional, the roof panel is covered by a headliner 25, which is an exposed cushioned fabric material colored to complement the interior decor of the vehicle. Mounting assembly 35 is designed to permit sunshade 26 to be horizontally pivoted from the shown position proximate the vehicle windshield 27 to a position proximate vehicle side window 28. As is conventional, the visor blade 30 is rotatably supported on the visor shaft 31 horizontally extending from mounting assembly 35, and can be coupled to support hook 32 to engage the visor in a conventional fashion. The shown construction of the sunshade is not material to the present invention, as mounting assembly 35 can be advantageously utilized with various styles of sunshades, and is particularly adapted in one embodiment for use with a sunshade having electrical circuitry for illumination of a vanity mirror. Moreover, while mounting assembly 35 is shown and described further herein as being used to mount an automobile visor, such use is illustrative and is not intended to be limiting as mounting assembly 35 can be adapted for other uses, such as where rotatable shafts or other parts need to be mounted in blind holes.

Figure 2:
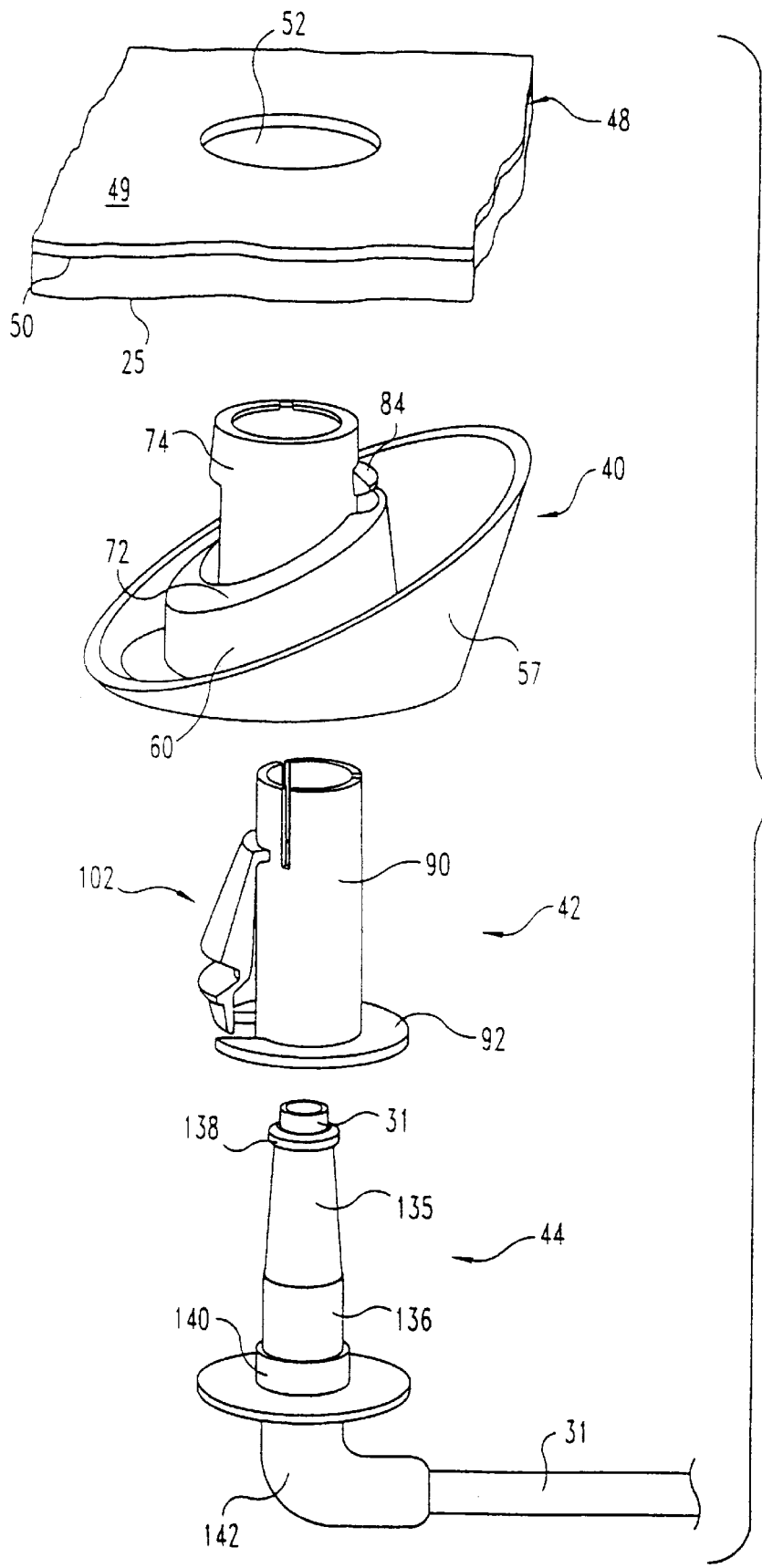
FIG. 2 is an exploded perspective view showing the outer bracket, the inner bracket and the elbow of the mounting assembly of FIG. 1, and with the apertured vehicle panel, to which the mounting assembly is operationally installed, diagrammatically shown.

As shown in the embodiment illustrated in the exploded view of FIG. 2, visor mounting assembly 35 can be formed in three parts including an outer or base bracket 40, an inner bracket 42 and an elbow 44. Visor mounting assembly 35 is installed as an assembled unit to an apertured panel 48 including an upper or distal surface 49 and a lower or proximal surface 50 covered by headliner 25. As used herein, proximal and distal are directional and/or positional references, as the case requires, relative to the location from which the mounting assembly 35 is inserted into the aperture of the panel during installation to panel 48. Thus, the top end of each of outer bracket 40, inner bracket 42 and elbow 44 from the perspective of a FIG. 2 viewer is a distal end of such part, while the bottom end of each part is naturally the proximal end of such part. Furthermore, although terms such as upper, lower, vertical, horizontal and the like may be used in the description of the disclosed embodiments, these terms are not to be interpreted as limiting the orientation of the described components or the scope of the invention, but rather are used to provide a more concise and understandable description of the shown disclosed embodiments.

Panel 48 includes a single aperture or hole 52 therethrough which is shown as being circular in shape. In alternate embodiments, different shapes of aperture 52 may be employed provided the shapes of the portions of mounting assembly 35 that engage the panel are correspondingly modified to allow connections to such panel. Panel 48 represents the interior roof of the vehicle which is conventionally made of sheet metal. Headliner 25, which includes a larger diameter opening aligned with panel hole 52, is clamped between the outer bracket skirt and panel proximal surface 50 when mounting assembly 35 is installed, and therefore outer bracket 40 can serve to assist in mounting headliner 25 directly to the vehicle, thereby facilitating assembly.

Figure 3:
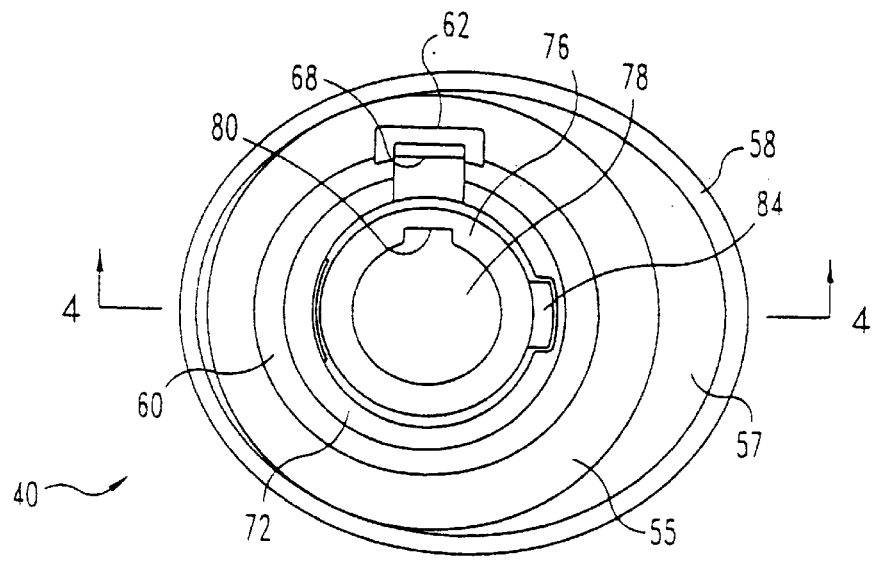
FIG. 3 is a top view of the outer bracket of FIG. 2 separate from the remainder of the mounting assembly.
Figure 4:
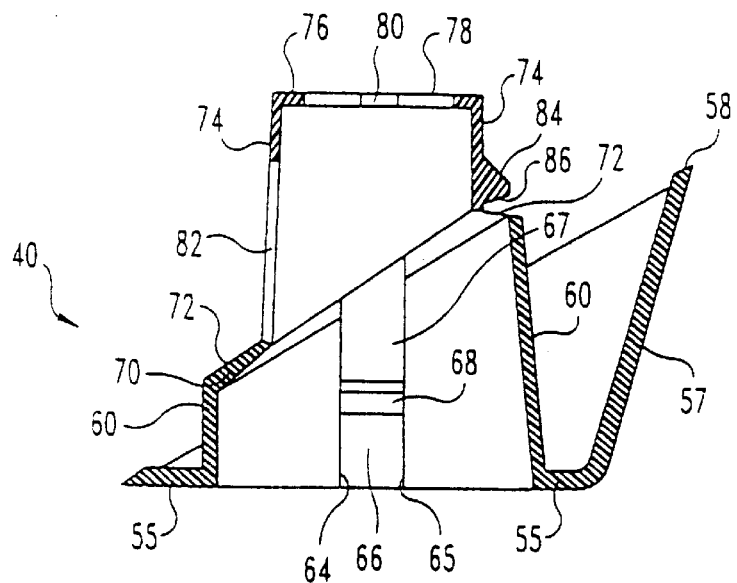
FIG. 4 is a cross-sectional view of the outer bracket, taken along line 4—4 of FIG. 3.

With additional reference now to FIGS. 3 and 4, outer bracket 40 may be molded in one piece from a suitable plastic material, such as ABS, polypropylene, nylon, or acetal plastic. Outer bracket 40 includes an aesthetically pleasing skirt formed of an annular base 55 from which extends an upstanding portion 57. Skirt portion 57 is particularly shaped in conjunction with the headliner and vehicle roof to which mounting assembly 35 is installed such that the skirt portion 57 is generally flush with the headliner when the outer bracket member is mounted. Specifically, the elliptical upper edge 58 of skirt portion 57 sandwiches headliner 25 against the proximal panel surface 50 when installed.

Figure 11:
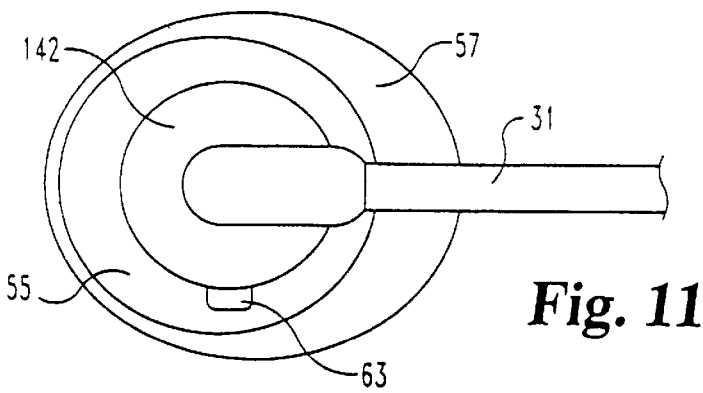
FIG. 11 is a bottom view of the mounting assembly of FIG. 9.
Figure 13:
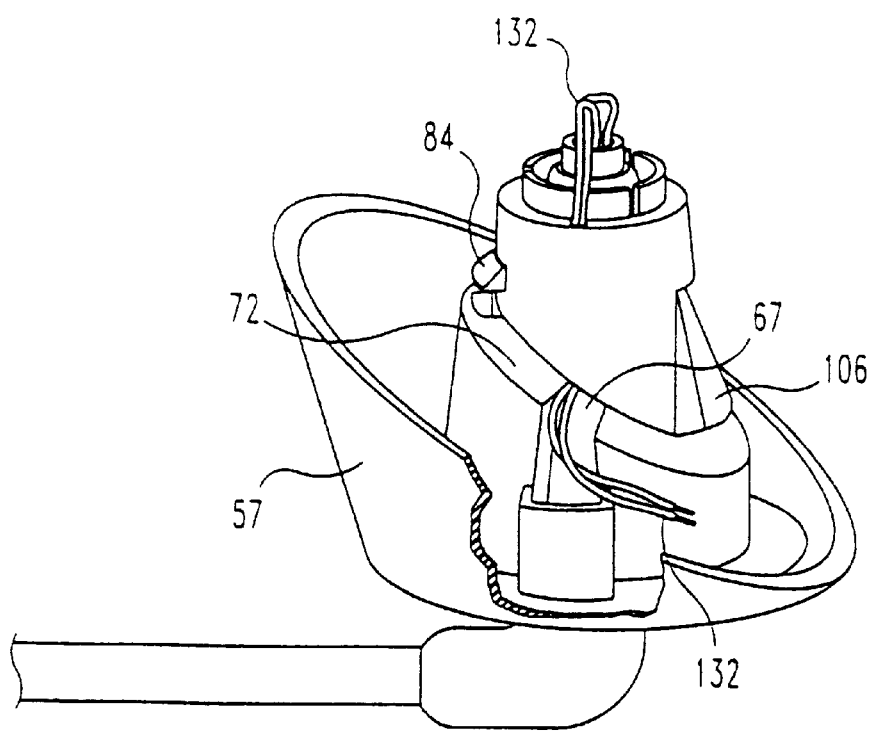
FIG. 13 is a rear perspective view of the assembled mounting assembly of FIG. 9, wherein part of the outer bracket skirt is broken away for purposes of illustration, and wherein electrical wiring leading to the visor is further shown.

Upwardly extending from the radial interior of annular base 55 is a tower portion 60 provided in the form of a tapered cylindrical sleeve. A radially outwardly stepped or protruding section 62 of tapered sleeve 60 has an interior surface forming side walls 64 and 65, and back wall 66. The interior hollow of stepped section 62 extends through the interior edge of annular base 55 in the form of a release tool-accommodating notch 63 shown in FIG. 11. The region of sleeve 60 above stepped section 62 is open at 67 as also shown in FIG. 13 to accommodate wiring passage and to facilitate molding. A ledge 68 projects radially inwardly from back wall 66 between side walls 64 and 65.

At its distal end, sleeve portion 60 terminates with an inwardly angled flange 70. The upper surface of flange 70 provides a beveled shoulder 72 that slopes upwardly as it extends radially inwardly from tower portion 60. As shown in the cross-sectional view of FIG. 4, the ring-shaped flange 70 is disposed at an angle relative to tower portion 60. This angling results from outer bracket 40 being shaped to account for the sloping of the vehicle ceiling panel to which it is designed for attachment. In alternate embodiments adapted for other ceiling contours, ring-shaped flange 70 can be angled differently relative to the bracket tower. For example, if the ceiling were both planar and exactly horizontally arranged, and if the mounting assembly were to mount a shaft to be rotatable about an exactly vertical axis, then the ring-shaped flange could be disposed perpendicular to a vertically oriented bracket tower and with the beveled shoulder being precisely frustroconical in shape.

Still further, in an alternate embodiment, rather than by a shoulder that provides a circumferentially extending panel support surface, the panel proximal surface may be operatively engaged by alternately configured portions of the outer bracket, or possibly portions of the inner bracket. For example, if no adaptor plate is used to mount the assembly to a headliner prior to installation to a panel, the panel proximal surface may be directly engaged and contacted by the distal, sloping faces of angularly spaced ribs that radially project from tower portion 60, which tower also may be otherwise shaped than the tapering sleeve construction described above within the scope of the invention.

Upwardly projecting from flange 70 is an upper tower portion 74 in the form of a generally cylindrical sleeve that tapers more gradually than sleeve portion 60, and which terminates with an annular cap 76 defining a central, circular opening 78 with notch 80. A first slot 82 running along part of the height of tower portion 74 accommodates a locking arm described further below. At a location along the tower circumference 180° from slot 82, the tower 74 is formed with a retaining hook or catch 84. A proximally facing, sloped surface 86 of catch 84 is designed to overlay distal surface 49 of apertured panel 48 during use.

While shown as having a one-piece construction, in alternate embodiments outer bracket 40 may be differently formed, such as with a separate skirt attachable to the tower 60. The opening shown in flange 70 below fixed catch 84 is not required for operational purposes, but rather facilitates the molding of catch 84 on outer bracket 40 in the illustrated embodiment. Although shown as an integral part of outer bracket 40, fixed catch 84 could be constructed as a projection from the exterior of inner bracket 42 which extends through an aligned opening in the outer bracket.

Figure 5:
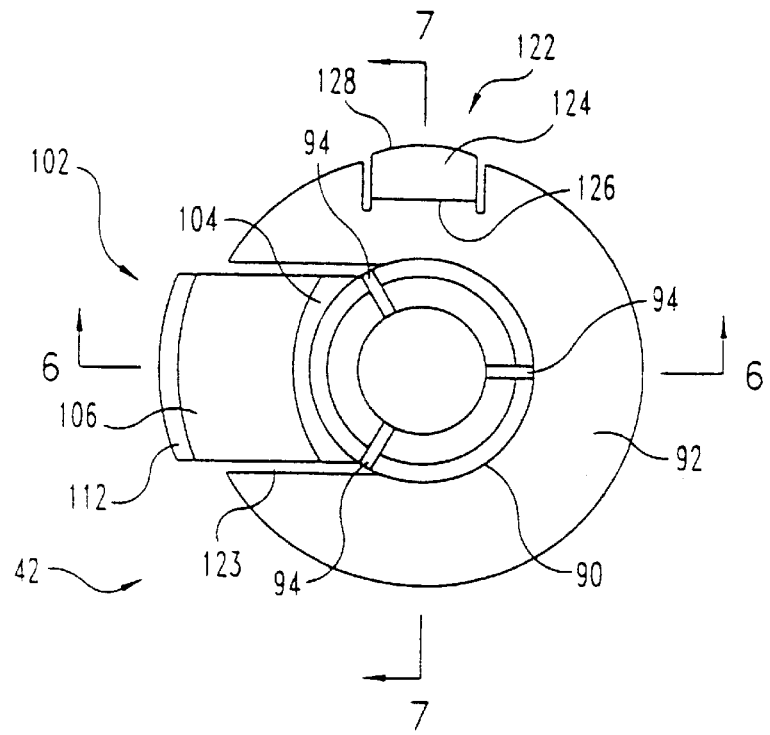
FIG. 5 is a top view of the inner bracket of FIG. 2 separate from the remainder of the mounting assembly.
Figure 6:
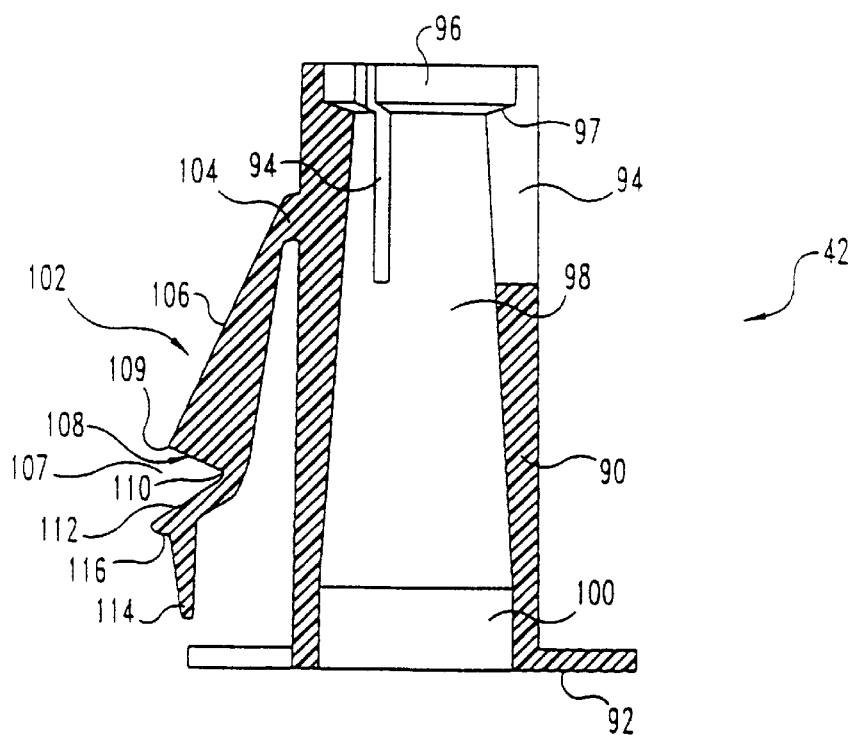
FIG. 6 is a cross-sectional view of the inner bracket, taken along line 6—6 of FIG. 5.

With reference now to FIG. 2 as well as FIGS. 5 and 6, inner bracket 42 is preferably molded in a single piece from a resilient material such as nylon, polypropylene, or acetal plastic. Such a construction material provides the resiliency that biases the inner bracket locking arm, after being shifted radially inward from its outward arrangement assumed under static conditions shown in FIG. 6, to the outward arrangement when an inward shifting force is removed. In other constructions, such radial biasing of the locking arm may be provided by additional spring components rather than by a resilient hinge construction.

Inner bracket 42 includes a tubular body 90 having a cylindrical outer periphery which extends in the distal direction from disk 92. The upper portion of tubular body 90 closely fits within outer bracket opening 78 and may even contact annular cap 76. Disk 92 closely fits within the interior hollow provided in outer bracket 40, so as to maintain the orientation of the inner bracket 42, and thereby the axis of rotation of the elbow 44, relative to the outer bracket 40. The upper or distal portion of inner bracket tubular body 90 is segmented by three circumferentially spaced, longitudinal slots 94 to allow the elbow to be inserted therein during assembly. The elbow-accommodating interior opening or hollow of tubular body 90 includes a disk-shaped region 96, the underside of which is defined by an inwardly protruding ledge 97. A tapered or frustroconical region 98 of the hollow extends between disk-shaped region 96 and a cylindrical region 100 at the proximal end of tubular body 90. The interior surface of body 90 along tapered region 98 and cylindrical region 100 contacts the tapered shaft of the elbow and the elbow collar to stabilize elbow rotation and provide frictional resistance to elbow rotation.

Integrally formed with tubular body 90 is a cantilevered, retractable locking arm or finger, generally designated 102. Locking arm 102 provides a panel engaging catch for mounting assembly 35, as well as serves to lock together the inner and outer brackets in the shown embodiment. Locking arm 102 includes a distal end 104 connected to body 90 and about which the locking arm rotates during its retraction. Locking arm 102 also includes a sloped segment 106 that proximally extends from arm distal end 104. Sloped segment 106 is inclined relative to the tubular body 90 and serves as a ramped region for panel engagement during mounting assembly installation. The outer radial periphery of ramped region 106 is convex in a horizontal plane with a curvature which generally conforms to the curvature of panel aperture 52. The proximal end of ramped region 106 defined by a notch 107 in the locking arm forms a catch surface generally designated 108. Catch surface 108 serves as a panel engaging catch for mounting assembly 35 which directly engages the distal surface 49 of panel 48 immediately adjacent aperture 52. To account for variations in panel thickness, catch surface 108 is configured such that its radially outward region 109 is in closer spaced relationship with distal end 104 than is inward region 110. One suitable shape of catch surface 108 is bowed or downwardly convex, but other shapes including the planar shape illustrated may provide the desired spaced relationship with the arm distal end 104. As a result, and as further described herein, a relatively thick apertured panel is engaged by catch surface 108 at outward region 109, while a relatively thin apertured panel is engaged by catch surface 108 at inward region 110, in which latter case locking arm 102 is disposed farther radially outward than when region 109 engages the panel distal surface.

Proximally extending from locking arm inward region 110 is a second, shorter sloped segment 112 which is inclined relative to tubular body 90. Sloped segment 112 serves as a ramped region which is engaged by outer bracket flange 70 to force locking arm 102 radially inward to a retracted position during the mounting assembly withdrawal process. The proximal end of locking arm 102 is a catch-defining flange 114 offset from sloped segment 112. The underside of sloped segment 112 located radially outward of flange 114 forms a catch surface 116 of a secondary catch. When locking arm 102 is distally shifted during the mounting assembly removal process, outer bracket flange 70 inserts into the catch space below sloped segment 112 and in engagement with catch surface 116 and flange 114 to axially and radially retain locking arm 102 in a release position.

Figure 7:
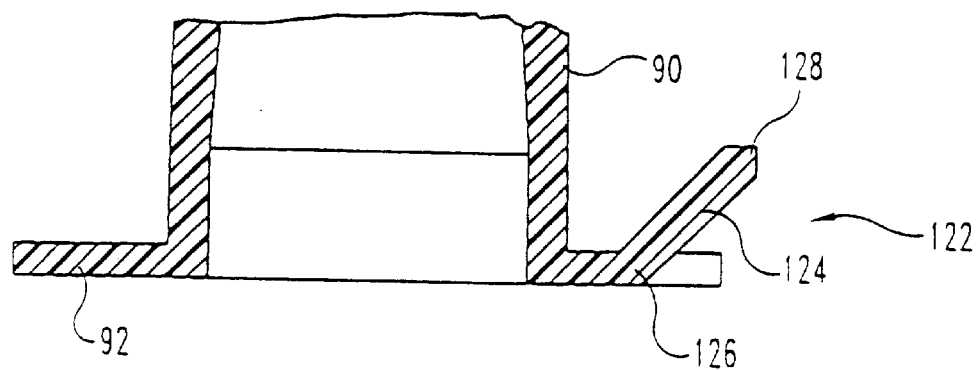
FIG. 7 is a cross-sectional view of a proximal portion of the inner bracket, taken along line 7—7 of FIG. 5, showing a release catch.

The base of inner bracket 42 is formed by disc 92 on which is located an axial locking member, generally designated 122 and best shown in FIGS. 5 and 7. Although shown integrally formed with tubular body 90, disc 92 may be a separate element and need not be secured to body 90 to prevent inadvertent axial movement of the inner bracket body. Disc 92 is sized and configured in conjunction with the interior volume of tower portion 60 to fit therein with sufficient diametric clearance to allow axial movement as further described herein. An opening 123 in disc 92 underneath the retractable locking arm 102 allows for arm molding. Locking member 122 in the shown embodiment is an upwardly angled catch 124 integrally formed with disc 92, and having a base end 126 at the planar disk 92 and an opposite catch end 128. Catch end 128 extends radially beyond disc 92 and is adapted to fit within stepped section 62 of tower portion 60. The side surfaces of catch 124 aid in limiting inner bracket rotation within the interior opening of outer bracket 40 by their abutting contact with stepped section side walls 64 and 65. Catch end 128, when in the static arrangement shown in FIG. 7, limits distal axial movement of inner bracket 42 into outer bracket 40 by abutting contact with the underside of the overhanging ledge 68 within stepped section 62. The resilient construction of inner bracket 42 allows locking catch 124 to be pivoted inward about base end 126 relative to disc 92 such that catch 124 clears the inner radial periphery of ledge 68, which pivoting can be effected by tool 129, such as a small, flat-bladed screwdriver, for example, being inserted up into gap 63 and into contact with the catch.

The angular positioning of the release catch relative to the locking arm of the inner bracket may be changed in alternate embodiments. Thus, although disposed at a 90° offset relative to the latching arm in the embodiment of FIG. 1, the release catch 124 can be otherwise configured, such as disposed at 180° from the retractable arm. Moreover, more than one release catch may be provided, such as a pair of catches spaced 180° from each other, as long as corresponding changes in the outer bracket, such as an additional stepped section and access opening in annular base 55, are provided. In addition, other forms of engagement between the inner and outer bracket which limit relative movement therebetween absent disengagement may be employed. For example, the movable catch may be on the outer bracket and adapted to engage a portion of the inner bracket.

With reference again to FIG. 2, in the shown embodiment, elbow 44 is formed by molding a plastic material, such as nylon or acetal plastic, over the bend of a hollow steel tube that forms the visor shaft 31. The hollow tube serves as a conduit through which wiring, such as shown in FIG. 13 at 132, may be routed to power the accessories, such as a lighted mirror, of sunshade 26. The approximately 90° bend shown is merely exemplary, as other angled bends may be employed depending upon the location at which the visor, or other vehicle component to which the rotatable shaft is connected, is to be disposed.

The vertical leg of elbow 44 designed to closely fit within the interior volume of inner bracket tubular body 90 includes a frustroconical length segment 135 above a cylindrical segment 136. The engagement of length segment 135 with the inner bracket surface defining frustroconical region 98 of the body hollow maintains the axis of rotation of the elbow and provides a frictional resistance to elbow rotation. A disk-shaped retention head 138 at the top of length segment 135 and including a chamfer around its top outer edge is designed to be press fit into and retained by the segmented top of inner bracket body 90. A collar portion 140 flaired into at the base of cylindrical segment 136 frictionally engages the interior of tubular body 90 to provide a controlled resistance to elbow rotation. The frictional resistance required for proper operation of the device is controlled by the amount of surface contact between the elbow and inner bracket and the pull in force generated by the fit of the retention head to the inner bracket. For example, manufacturing collar portion 140 with different heights changes the contact surface with the inner bracket to control the resistance to rotation. The region of elbow 44 below collar portion 140 is a skirt 142 that conforms to the stylistic or ergonomic requirements of the particular application. Therefore, although shown as a disk from which downwardly extends an L-shaped projection encasing the visor shaft, which disk fits within the opening defined by the annular base 55 of the outer bracket and is flush with that base after its initial installation, other elbow skirt configurations may be provided within the scope of the invention.

Figure 8:
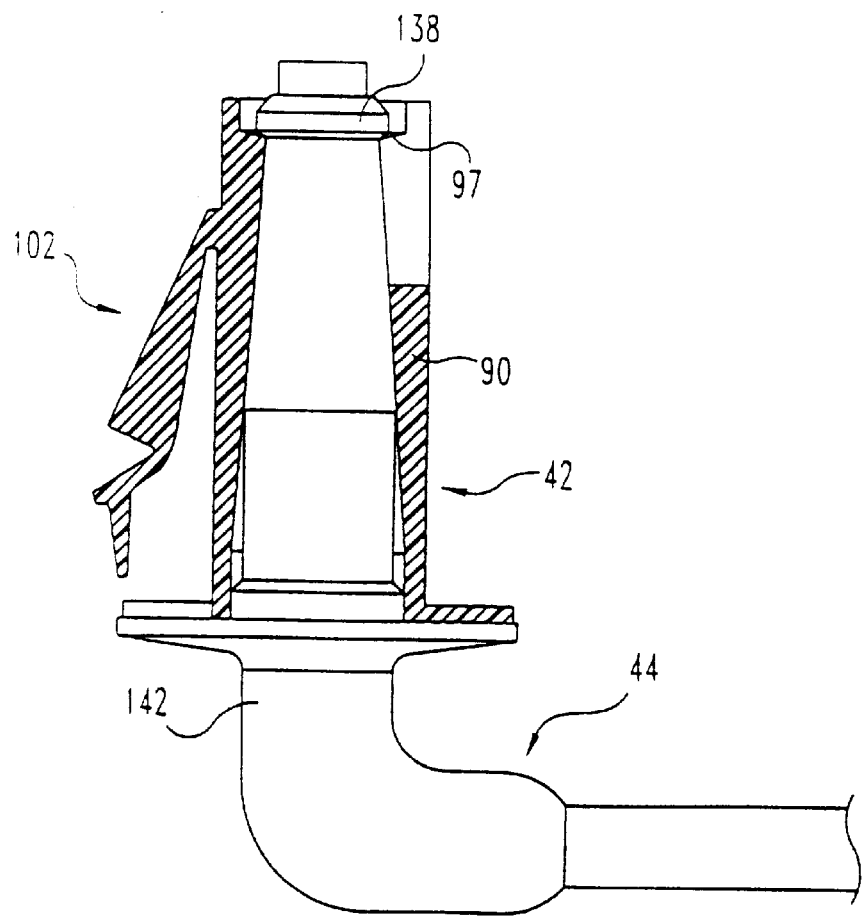
FIG. 8 is a partial cross-sectional view of the mounting assembly of FIG. 2 during a stage of its assembly at which the elbow and inner bracket are interconnected, and prior to the shown inner bracket and elbow subassembly being assembled to the outer bracket.
Figure 9:
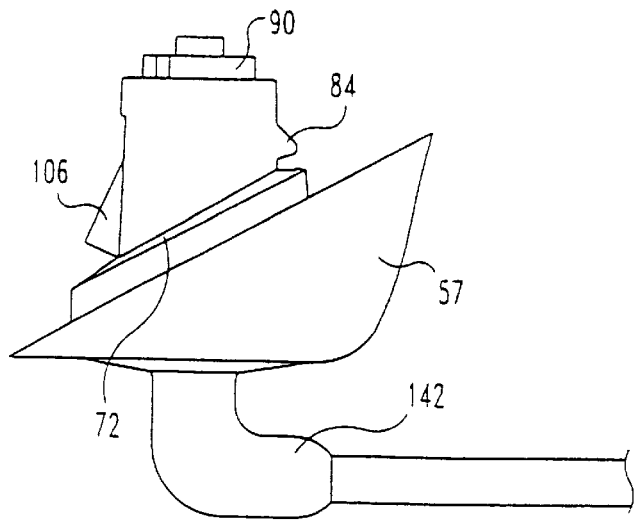
FIG. 9 is a front elevational view of the mounting assembly of FIG. 2 after its component parts are assembled together, and prior to installation in the vehicle apertured panel.
Figure 10:
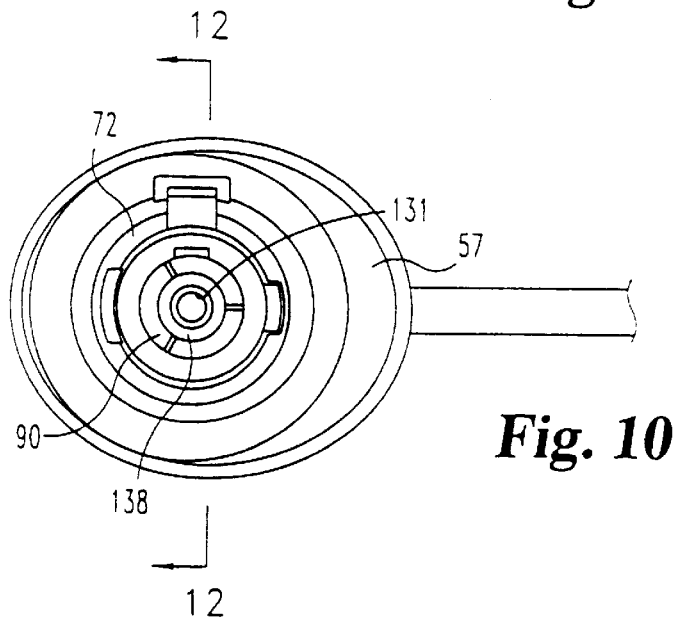
FIG. 10 is a top view of the mounting assembly of FIG. 9.

To connect elbow 44 to inner bracket 42 for use, when oriented as shown in FIG. 2, elbow 44 is upwardly or distally inserted into the tapering interior volume of tubular body 90. During this process, care is taken to ensure that any included wires 132 are routed through the tubular body 90 ahead of the elbow. As retention head 138 has a larger diameter than the diametric clearance of protruding ledge 97, when sufficient upward force is applied to the elbow, the upper portion of body 90 segmented by slots 94 resiliently bend outward to allow retention head 138 to be inserted past ledge 97, at which point the segmented upper portion of body 90 snaps back to a static position to effectively lock elbow 44 in inner bracket 42 as shown in FIG. 8. The underside of retention head 138 and the top surface of ledge 97 are angled to provide an upward pull-in force on elbow 44 to ensure the frictional engagement of elbow 44 and inner bracket 42 described above. Elbow 44 is free to rotate with 360° of rotation about its axis of insertion and relative to the inner bracket 42 when torque sufficient to overcome the frictional force between the elbow and the inner bracket is applied.

To connect the inner bracket and elbow subassembly to outer bracket 40 for use, the subassembly is first rotationally oriented such that locking arm 102 is aligned below tower slot 82, and then upwardly or distally inserted into the interior volume of tower portion 60. During this process, any included wires 132 are routed through the opening 78 ahead of the upper extent of the elbow and inner bracket inserted therein. As the insertion in the distal direction continues, ramped region 106 of arm 102 engages and slides along flange 70, which engagement forces arm 102 radially inward until flange 70 reaches notch 107. When the proximal tip of ramped region 106 passes flange 70 which inserts into notch 107, locking arm 102 springs radially outward due to its resilient construction such that ramped region 106 extends outward through tower slot 82. It will be appreciated that withdrawal of the elbow and inner bracket subassembly in the proximal direction from the outer bracket is then prevented by the engagement of catch surface 108 with flange 70, which defines the bottom edge of the locking arm accommodating slot 82. As arm 102 springs outward into slot 82, its engagement with flange 70 may pull the subassembly upward until release catch 124 engages ledge 68 and halts further insertion. Otherwise, release catch 124 will engage ledge 68 to halt further insertion of the elbow and inner bracket subassembly upon further pressing of same in the proximal direction. At this point, mounting assembly 35 is configured as shown in FIGS. 9–12 prepared for installation into apertured panel 48, or a vehicle headliner. In cases where wires 132 are included, in preparation for mounting assembly installation, wires 132 are routed downward into notch 80, within the gap between outer bracket sleeve portion 74 and inner bracket body 90, and then out through sleeve opening 67 below flange 70 to allow for electrical connection with wires typically provided on the proximal side of panel 48, such as on the headliner 25. This internal wire way provides a protected path for wires 132 to pass inside assembly 35 through the sheet metal opening to help avoid being damaged by contact with panel 48 during installation.

The structure of mounting assembly 35 will be further understood in view of the following explanation of its installation and operation with reference to FIGS. 14–18.

The assembled mounting assembly 35, in which the release catch 124 is engaged by ledge 68 such that the disk of elbow skirt 142 is generally flush with the bottom of outer bracket 40, is initially placed in the pre-installed position shown in FIG. 14 generally below or proximal aperture 52 of the headliner covered panel 48.

Figure 14:
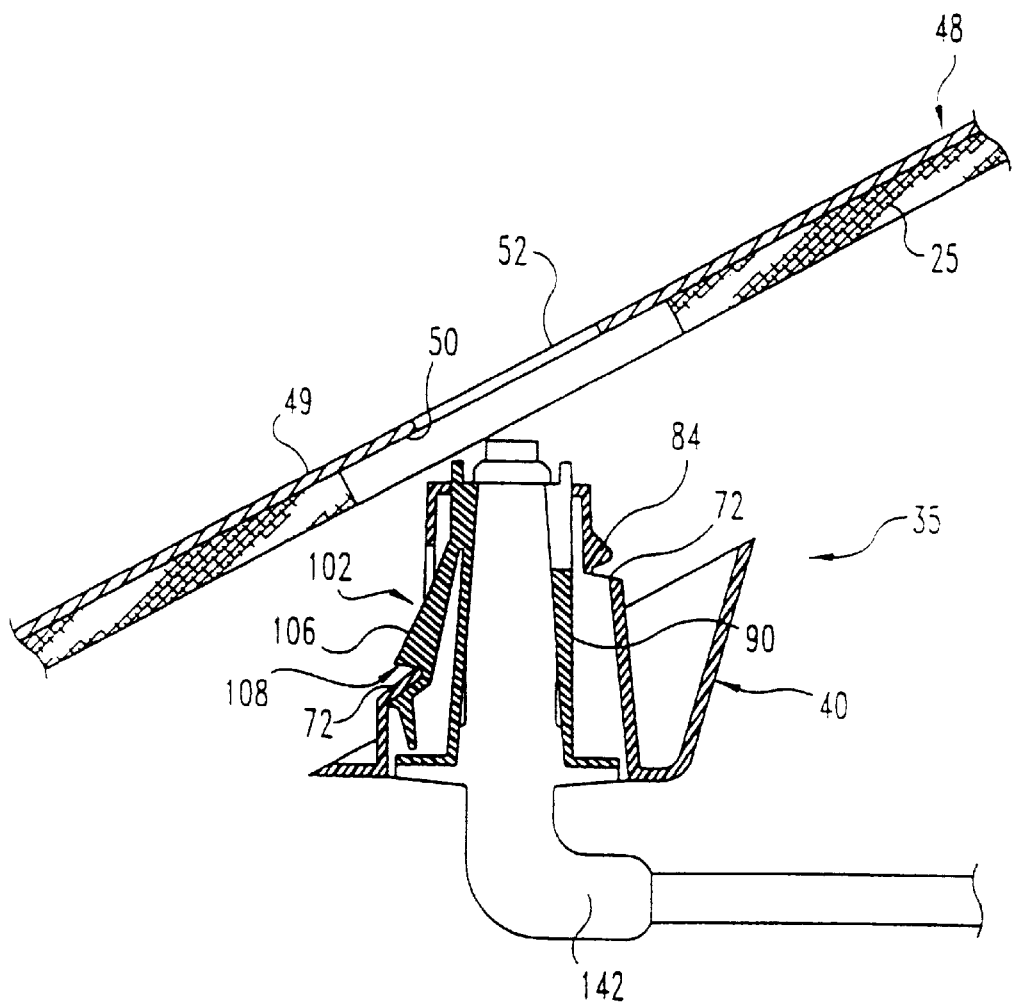
FIG. 14 is a diagrammatic, partial cross-sectional view of a visor mounting assembly of the present invention prior to its installation to an apertured panel covered with a headliner.
Figure 15:
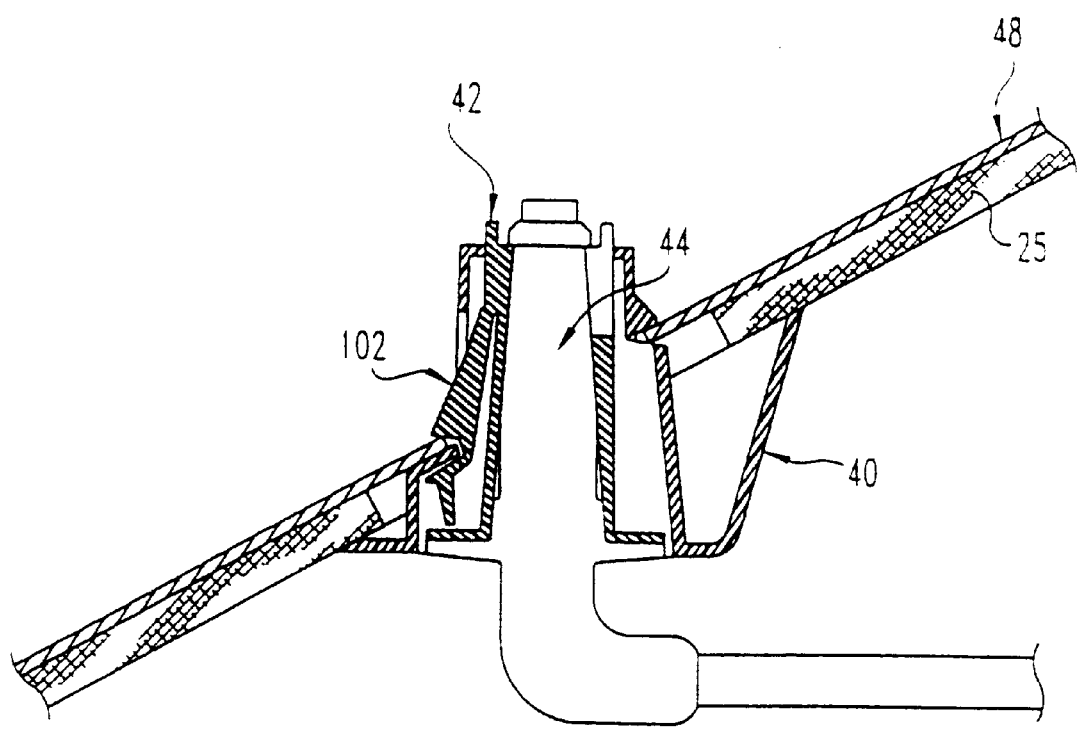
FIG. 15 shows a diagrammatic, partial cross-sectional view of the visor mounting assembly of FIG. 14 after its installation to the apertured panel.

After an installer slightly rotates mounting assembly 35 counterclockwise from the orientation shown in FIG. 14 such that the inner bracket body 90 and the retained upper leg of elbow 44 are about perpendicular to the panel opening, the mounting assembly is distally inserted through opening 52 such that panel 48 enters the space between fixed catch 84 and the beveled shoulder 72 under that fixed catch. Then, with the fixed catch so engaged, mounting assembly 35 is further inserted by being pivoted clockwise from the perspective of a FIG. 14 viewer about the fixed catch engagement with the panel. During this pivoting, and because the locking arm 102 has been designed in view of the size of the panel aperture to extend beyond the expanse of the aperture to overlay the panel distal surface 49 when installed, locking arm ramped region 106 engages and slides along the aperture-defining portion of panel 48, which engagement forces arm 102 radially inward against the bias of its resilient construction. It will be recognized that as the arm is forced radially inward, the resulting force on mounting assembly 35 tends to seat panel 48 further under fixed catch 84 against bevel shoulder 72. As pivoting continues, when arm 102 has been moved sufficiently upward such that the proximal end of arm ramped region 106 passes the top edge of panel 48 and the panel fits into notch 107, locking arm 102 automatically expands radially outward until panel 48 is directly engaged or sandwiched between bevel shoulder 72 and catch surface 108. The actual distance the locking arm moves radially outward is a function of the panel thickness and aperture size, and allows mounting assembly 35 to account for slight variations in such thickness and size. This automatic expansion of the locking arm 102 to engage the panel distal surface may be felt, and in some circumstances actually heard, by an installer moving the mounting assembly who then knows the installation is complete. After such complete installation, mounting assembly 35 is configured as shown in FIG. 15, in which headliner 25 is held in place against panel 48, and elbow 44 is free to rotate relative to the inner bracket 42 and outer bracket 40 to permit the sunvisor to be moved. It will be appreciated that due to the swept-down configuration of locking arm 102, any pull forces applied to the installed mounting assembly 35 tend to further expand or splay outward locking arm 102, which further resists mounting assembly withdrawal from the apertured panel.

Figure 16:
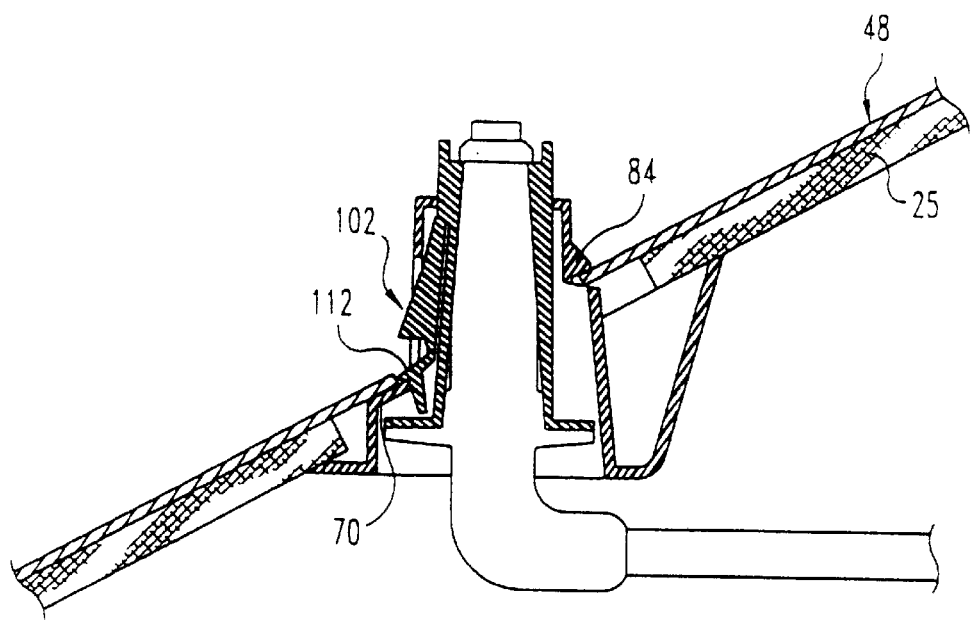
FIG. 16 shows the visor mounting assembly of FIG. 15 after the release catch has been activated and the inner bracket has been shifted axially relative to the outer bracket during the first stage of the removal of the mounting assembly from the apertured panel.

On occasion, it may be necessary for the manufacturer or service provider to remove the installed mounting assembly 35. To remove the assembly, release catch 124 is first unlocked by being pivoted clear of ledge 68 through the use of a flatbladed tool inserted within gap 63. Then, the elbow and inner bracket subassembly is manually axially moved distally into the stationary outer bracket 44. During this subassembly movement, locking arm 102 is radially retracted by the sliding engagement of outer bracket flange 70 with sloped segment 112. When distal movement of locking arm 102 results in flange 70 clicking into place against catch surface 116 and flange 114, the locking arm 102 is retained in a retracted release position as shown in FIG. 16. When so positioned, locking arm 102 is clear of the space above panel distal surface 49, and proximal movement of the inner bracket and elbow subassembly relative to the outer bracket 40 is prevented by the engagement of flange 70 with catch surface 116.

Figure 17:
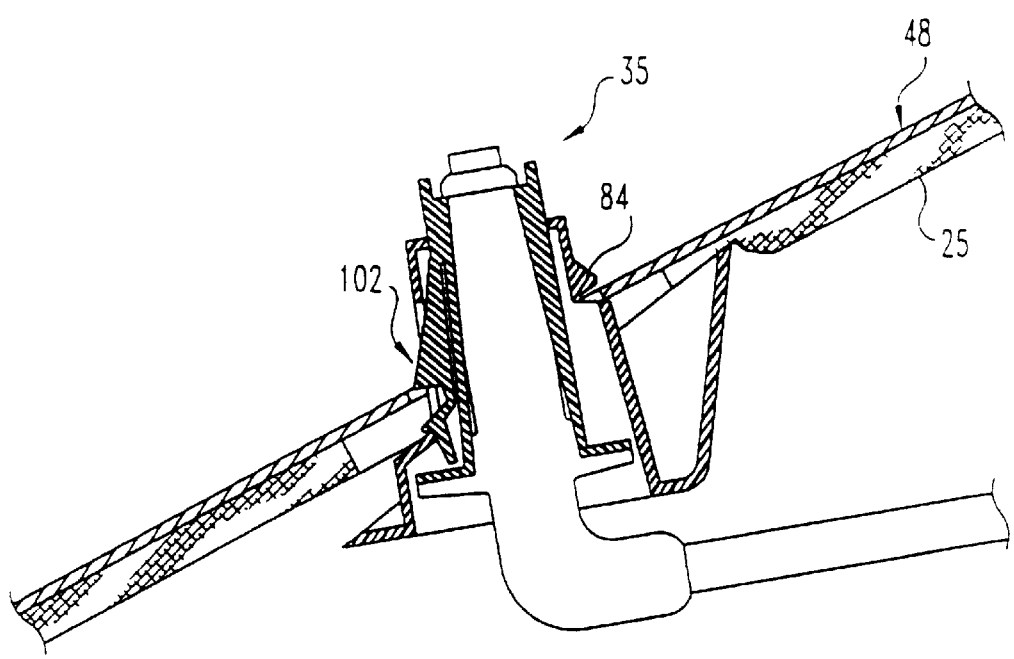
FIG. 17 shows the visor mounting assembly of FIG. 16 being proximally withdrawn from the apertured panel.
Figure 18:
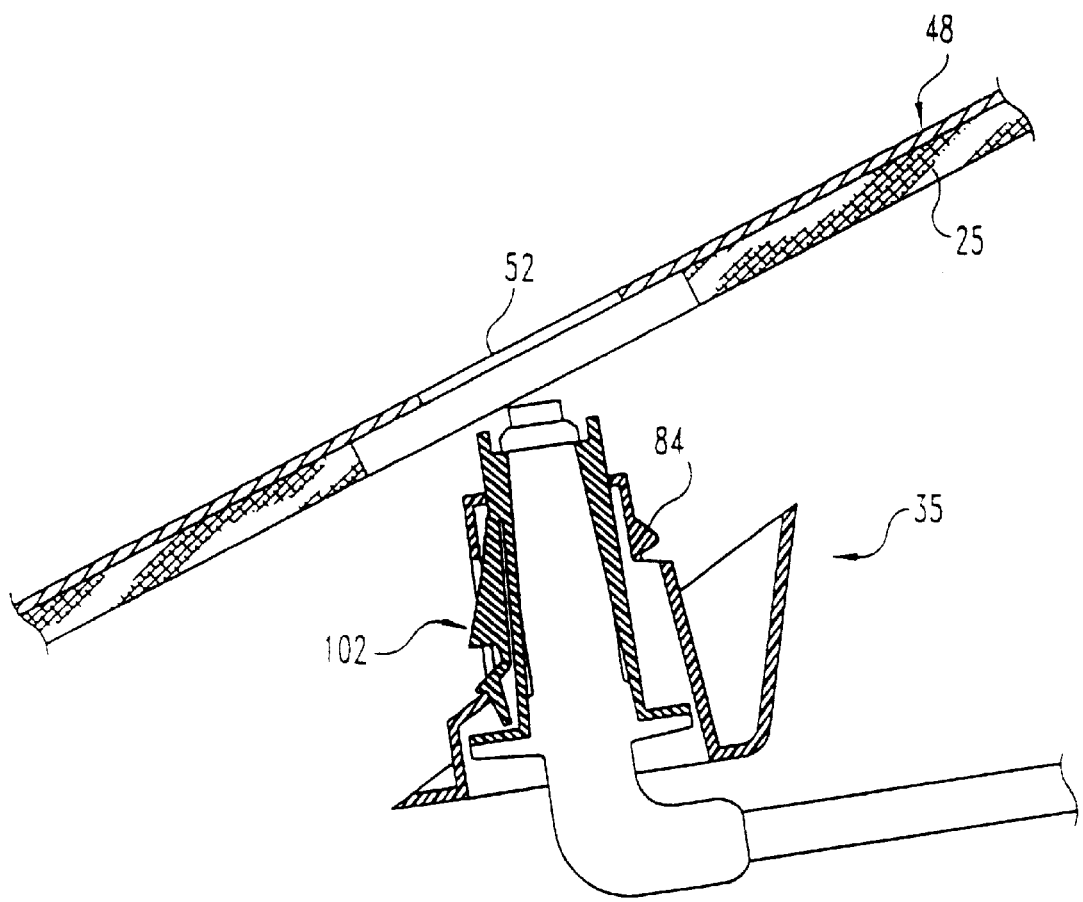
FIG. 18 shows the visor mounting assembly of FIG. 17 after its proximal withdrawal from the vehicle panel is complete.

With the locking arm 102 so locked, while gripping the exposed elbow the user can reverse the installation process by pivoting out the mounting assembly as shown in FIG. 17 and then pulling down the mounting assembly 35 to the position shown in FIG. 18. In order to reconfigure mounting assembly 35 for reinstallation at a subsequent time, the ramped region 106 of locking arm 102 can be manually pressed radially in to cause flange 70 to disengage from catch surface 116, and then while holding the locking arm in, pulling down on the elbow until the assembly is returned to its assembled arrangement.

Figure 19:
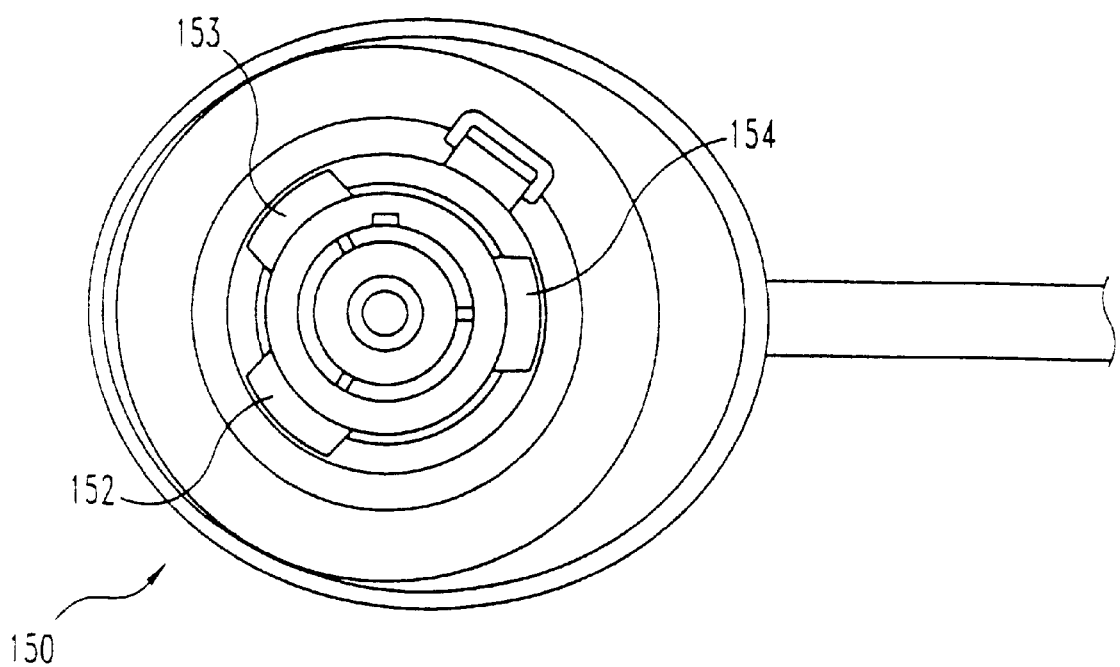
FIG. 19 is a diagrammatic top view of an alternate mounting assembly of the present invention employing multiple resilient locking arms.
Figure 20:
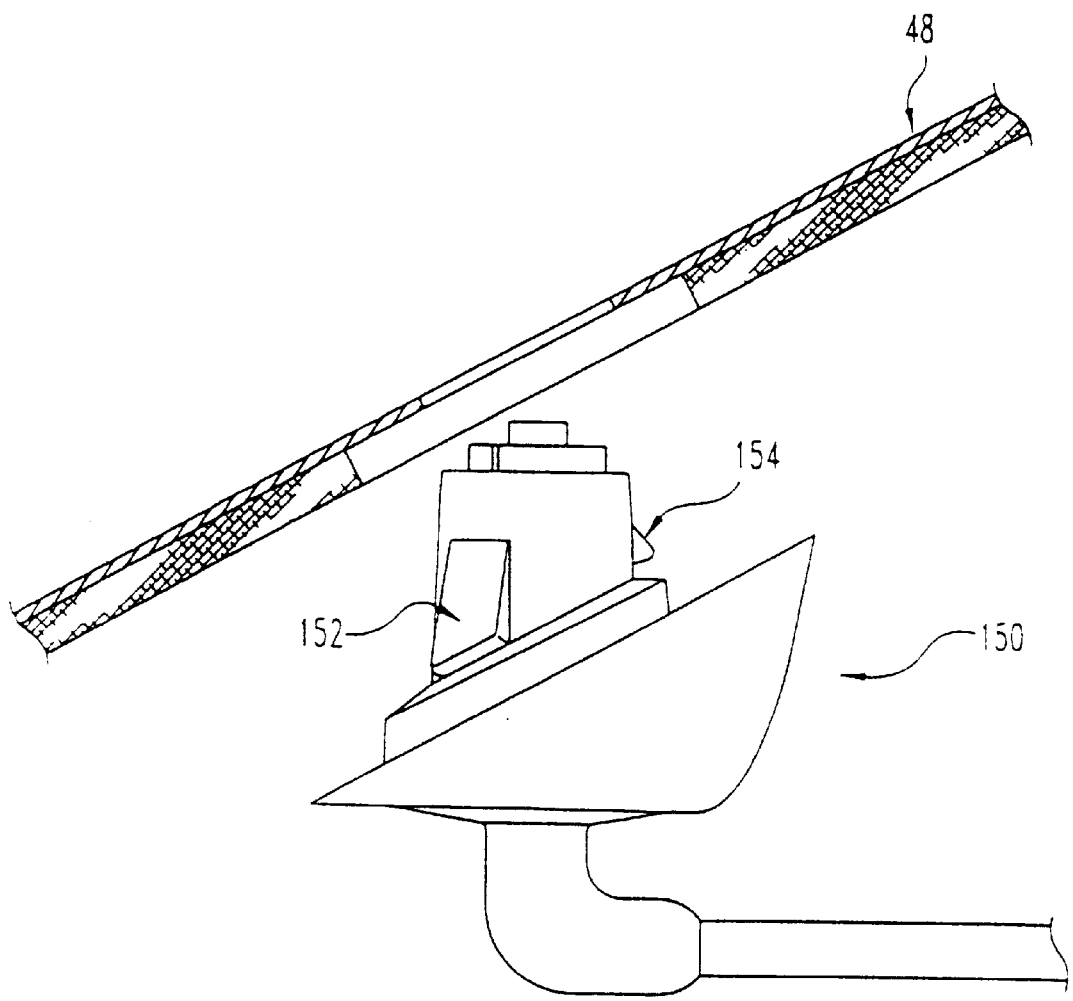
FIG. 20 is a front view of the mounting assembly of FIG. 19 prior to its installation to an apertured panel.

While at least two panel-engaging catches are preferably used, in the inventive mounting assembly a fixed catch is not required. For example, catch 84 may be provided in the form of a resilient locking arm similar in concept to locking arm 102. In addition, more than two locking arms, as well as locking arms or catches arranged at other than the 180° spacing shown in the embodiment of FIG. 2, may be employed. For example, such an alternate embodiment of a mounting assembly of the present invention is shown in FIGS. 19 and 20. The alternate mounting assembly 150 is similar to mounting assembly 35 and may be substituted therefor, but instead of a fixed catch and a single locking arm includes three resilient locking arms, generally designated 152, 153 and 154. Locking arms 152–154 are similar in concept to locking arm 102 of mounting assembly 35 and extend from the inner bracket through openings in the outer bracket. The outer tips of locking arms 152 and 153 are angled down as shown in FIG. 20 to account for how such arms engage the sloping panel.

The embodiments of FIGS. 21–36 are generally similar to that of FIGS. 2–20 discussed above, where similar features and operations between same are not further discussed below.

Figure 21:
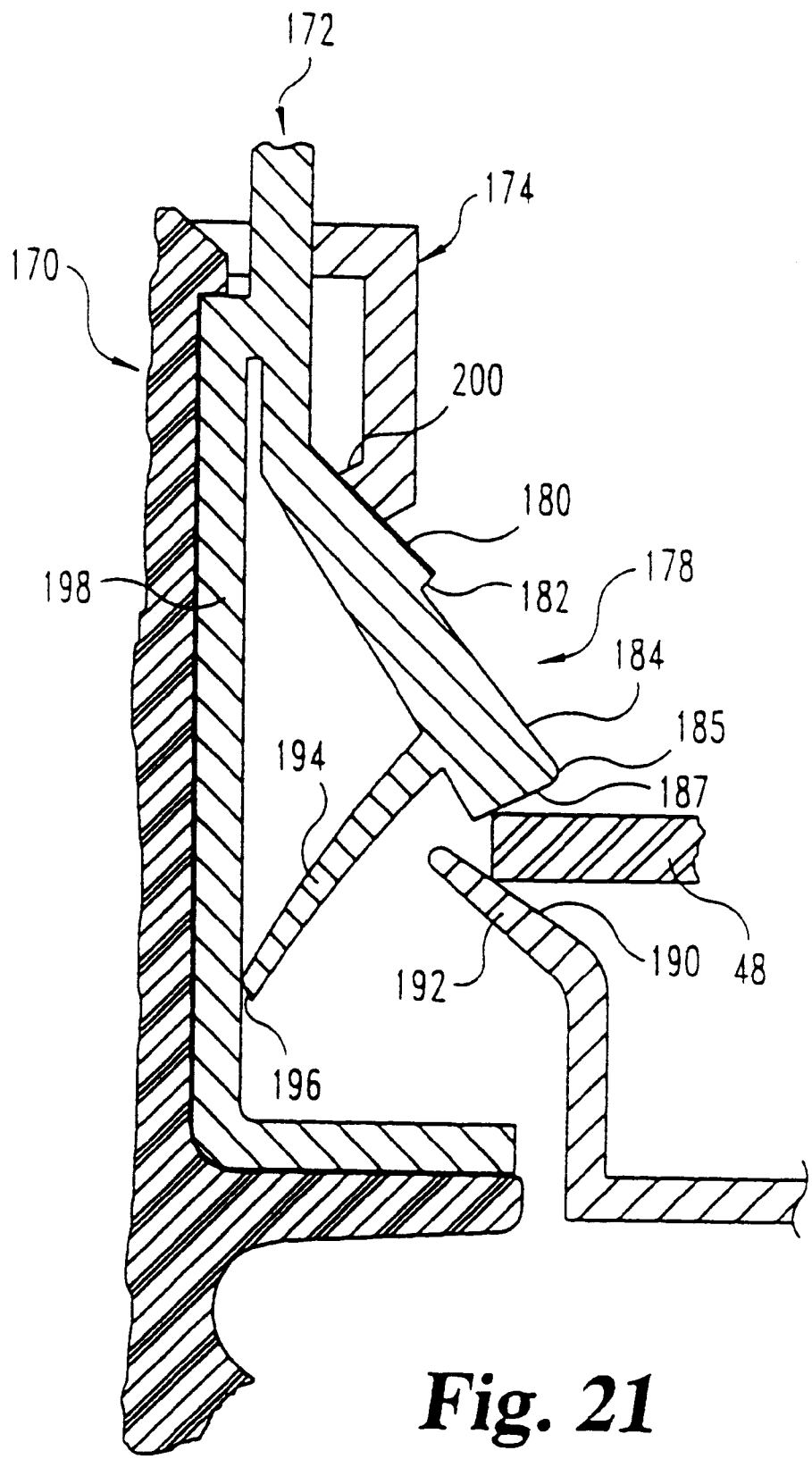
FIG. 21 is a diagrammatic, partial cross-sectional view of another mounting it assembly of the present invention having an alternate locking arm design.

Referring now to FIG. 21, there is shown a fragmentary cross-sectional view of still another alternate embodiment of the present invention. This mounting assembly includes an elbow 170 identical to elbow 44 of the embodiment of FIG. 2, and an inner bracket 172 and an outer bracket 174 which are similar to inner bracket 42 and outer bracket 40 but differ as specified herein. The resilient locking arm 178 includes an upper ramped region 180 with catch 182 formed thereon. A panel-engaging lower ramped region 184 extends from below catch 182 to a proximal tip 185, the underside of which provides a catch surface 187 adapted to sandwich panel 48 against a beveled shoulder 190 of outer bracket flange 192. An extension portion 194 extending down from the inward face of lower ramped region 184 has a proximal end 196 that contacts body 198 of inner bracket 172. Extension arm 194 engages flange 192 to prevent the over-travel of locking arm 178 in a radially outward direction, as well as when bent by contact with body 198, provides a leaf-spring type return force on locking arm 178 when the locking arm is pressed inward to thereby assist in biasing outward the locking arm to provide a proper engagement with panel 48. An overhanging lip 200 of outer bracket 174 engages upper ramped region 180 when inner bracket 172 is forced distally relative to outer bracket 174 during the mounting assembly withdrawal process to force locking arm 178 radially inward. When inner bracket 172 is moved sufficiently distally, lip 200 inserts into catch 182 to cause locking arm 178 to be retained in a radially retracted position at which the locking arm is radially clear of the panel to allow withdrawal.

In the embodiments of FIGS. 1–21, the primary and secondary catches associated with the resilient locking arm are each located on the resilient locking arm, one above the other. However, as shown in the embodiments of FIGS. 23–26, the secondary catch need not be disposed on the resilient locking arm, but rather may be associated with another component of the mounting assembly.

Figure 12:
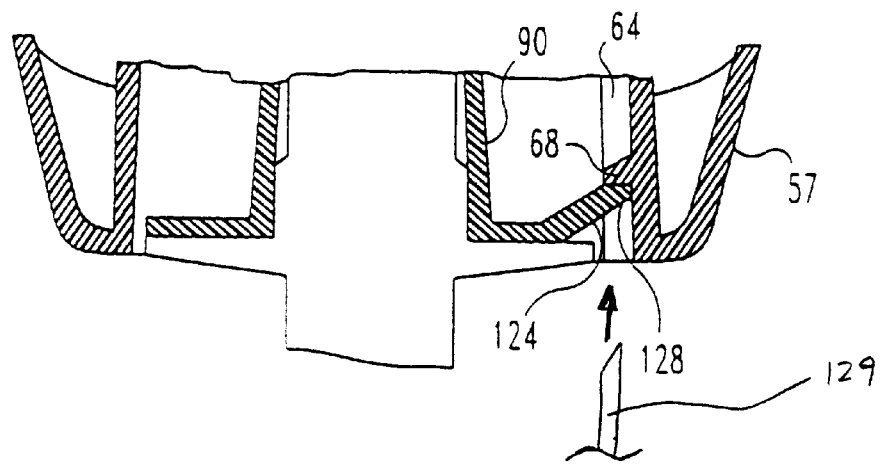
FIG. 12 is a partial cross-sectional view of a proximal portion of the mounting assembly taken along line 12—12 of FIG. 10, showing the engaged release catch.
Figure 23:
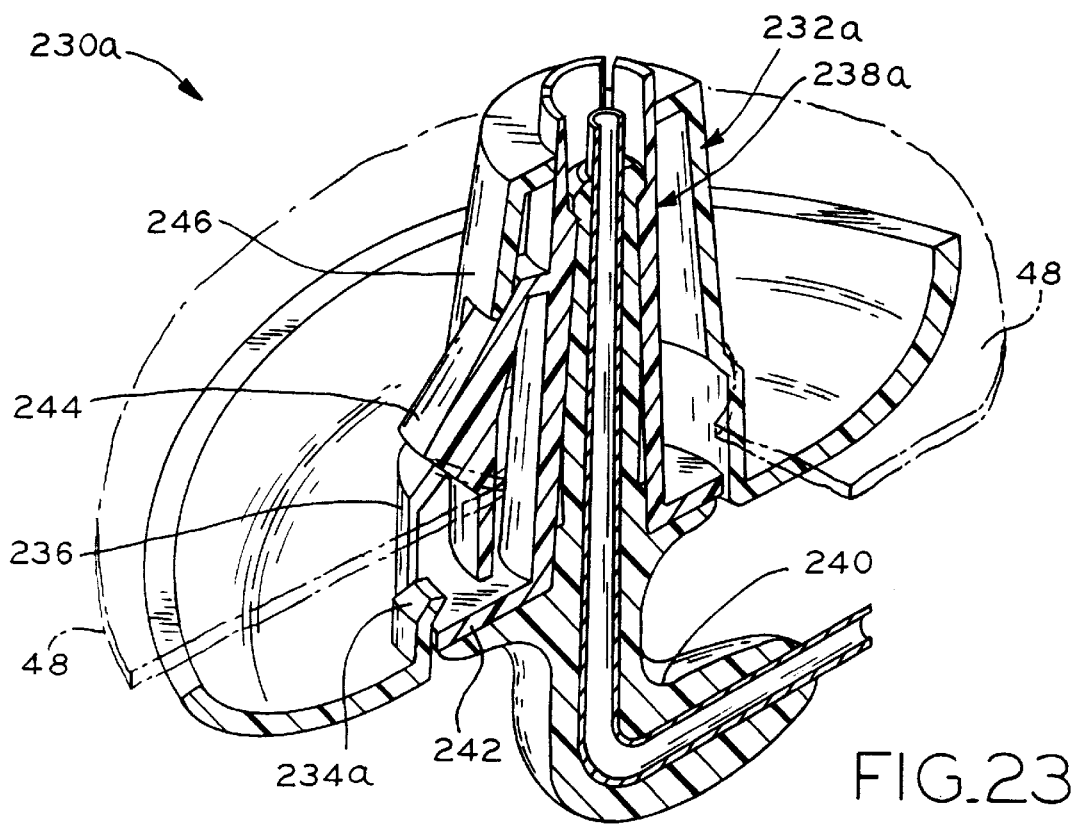
FIG. 23 is a sectional view of another mounting assembly of the present invention, showing the mounting assembly engaged with a panel, the panel shown in ghost lines, and a secondary catch of the outer bracket in a disengaged position.
Figure 24:
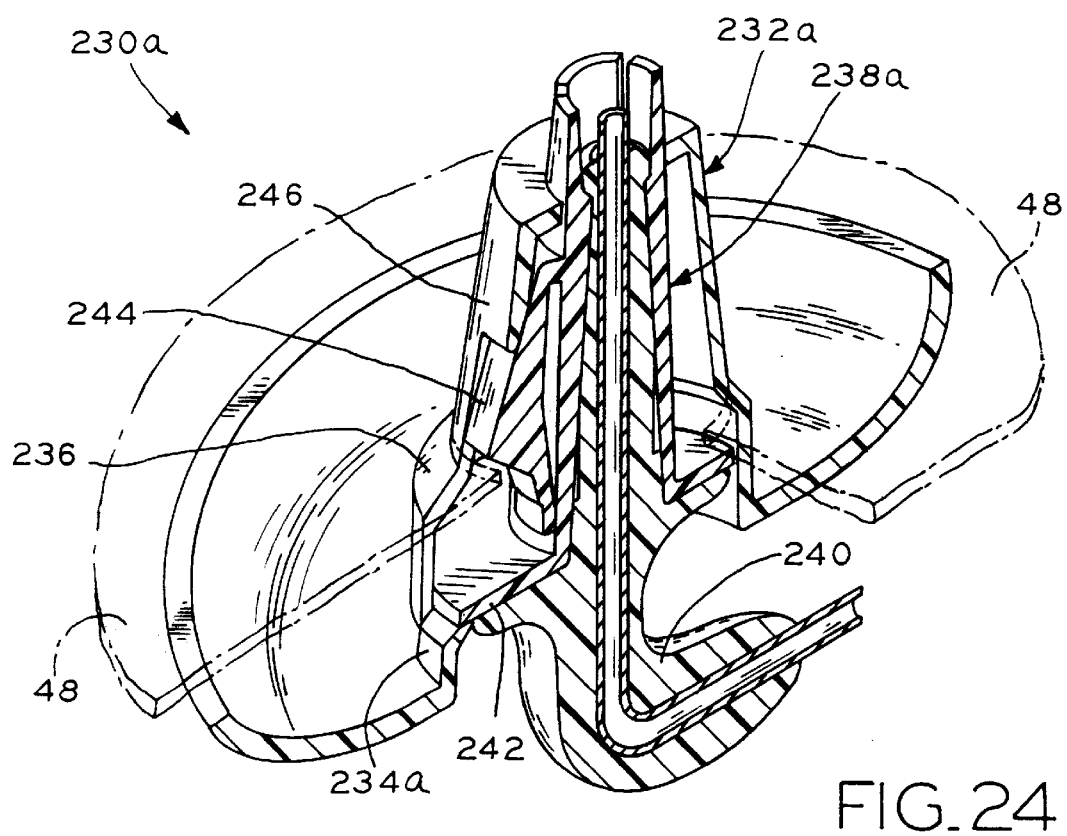
FIG. 24 is a sectional view of the mounting assembly of FIG. 23, showing the mounting assembly disengaged from the panel, and the secondary catch of the outer bracket in an engaged position.

As shown in FIG. 23, mounting assembly 230*a* includes outer bracket 232*a* with secondary catch 234*a* depending into the interior of tower portion 236 thereof. A release catch (not shown), similar to that of FIG. 12, is disposed between outer bracket 232*a* and inner bracket 238*a*, which must be released before elbow 240 and inner bracket 238*a* may be pushed upwardly into outer bracket 232*a*. When elbow 240 and inner bracket 238*a* are pushed upwardly into outer bracket 232*a* as shown in FIG. 24, disk 242 of inner bracket 238*a* biases secondary catch 234*a* outwardly, whereupon secondary catch 234*a* returns to its initial position after disk 242 has passed secondary catch 234*a*, thereby locking the elbow and inner bracket subassembly in a release position in which resilient locking arm 244 of inner bracket 238*a* is retracted by engagement with upper portion 246 of outer bracket 232*a*, such that mounting assembly 230*a* may be disengaged from panel 48 and removed therefrom. Only a single resilient locking arm 244 of inner bracket 238*a* is shown in FIGS. 23–26, however, similar to the embodiment shown in FIGS. 19 and 20, inner bracket 238*a* may include multiple resilient locking arms 244.

Figure 25:
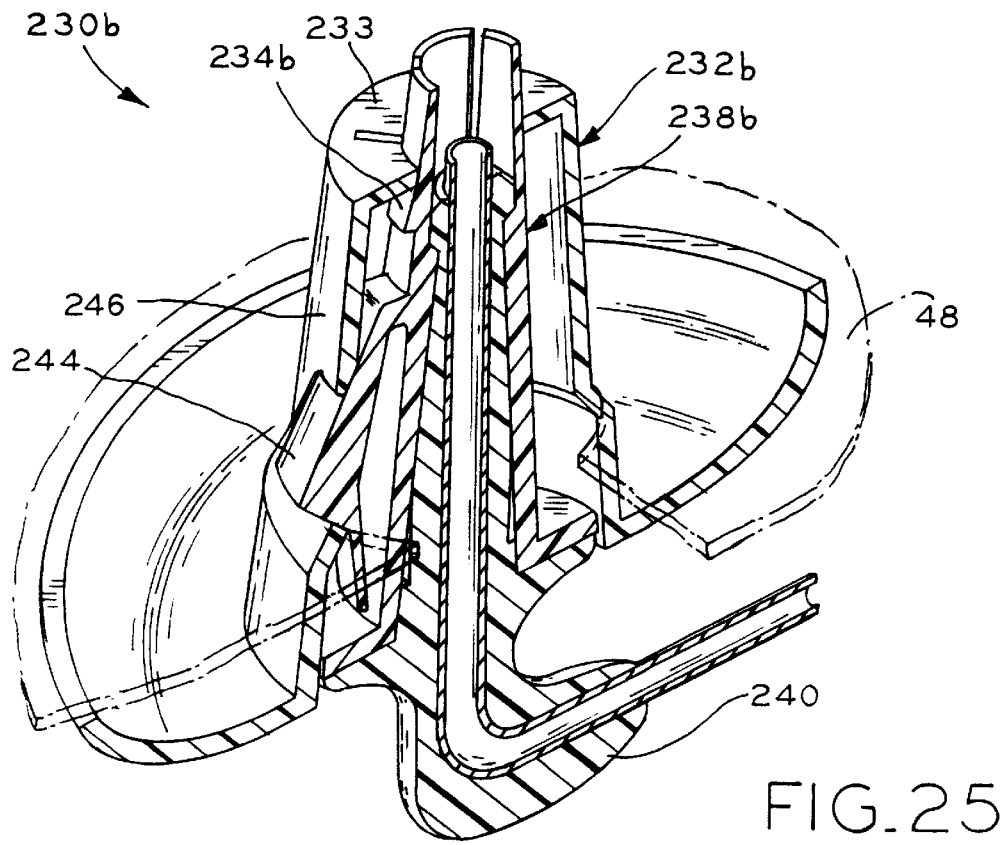
FIG. 25 is a sectional view of another mounting assembly of the present invention, showing the mounting assembly engaged with a panel, the panel shown in ghost lines, and a secondary catch of the inner bracket in a disengaged position.
Figure 26:
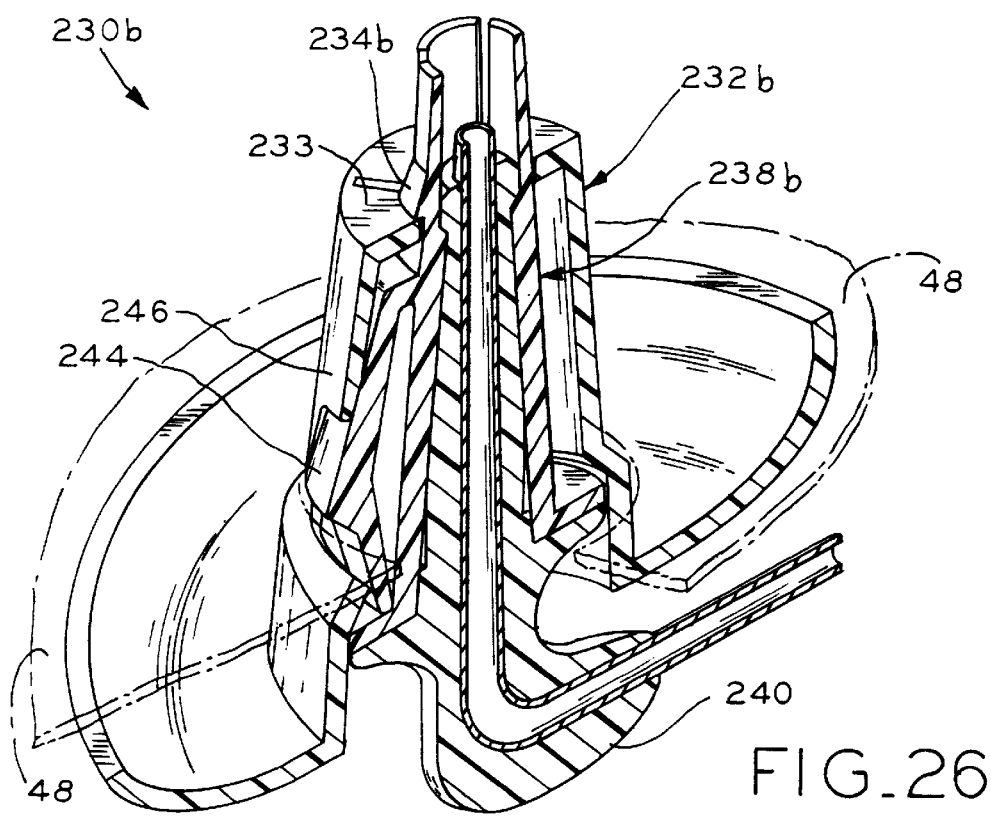
FIG. 26 is a sectional view of the mounting assembly of FIG. 25, showing the mounting assembly disengaged from the panel and the secondary catch of the inner bracket in an engaged position.

Mounting assembly 230*b*, shown in FIG. 25, is identical to mounting assembly 230*a*, except that inner bracket 238*b* includes secondary catch 234*b* formed therein, which is disposed above resilient locking arm 244. Locking arm 244 is biased inwardly by engagement with upper portion 246 of outer bracket 232*b* as the elbow and inner bracket subassembly is pushed upwardly into outer bracket 232*b*. As shown in FIG. 26, secondary catch 234*b* engages to surface 233 of outer bracket 232*b* to lock inner bracket 238*b* in a position wherein resilient locking arm 244 is retracted, such that mounting assembly 230*b* may be disengaged from panel 48 and removed therefrom.

Figure 22:
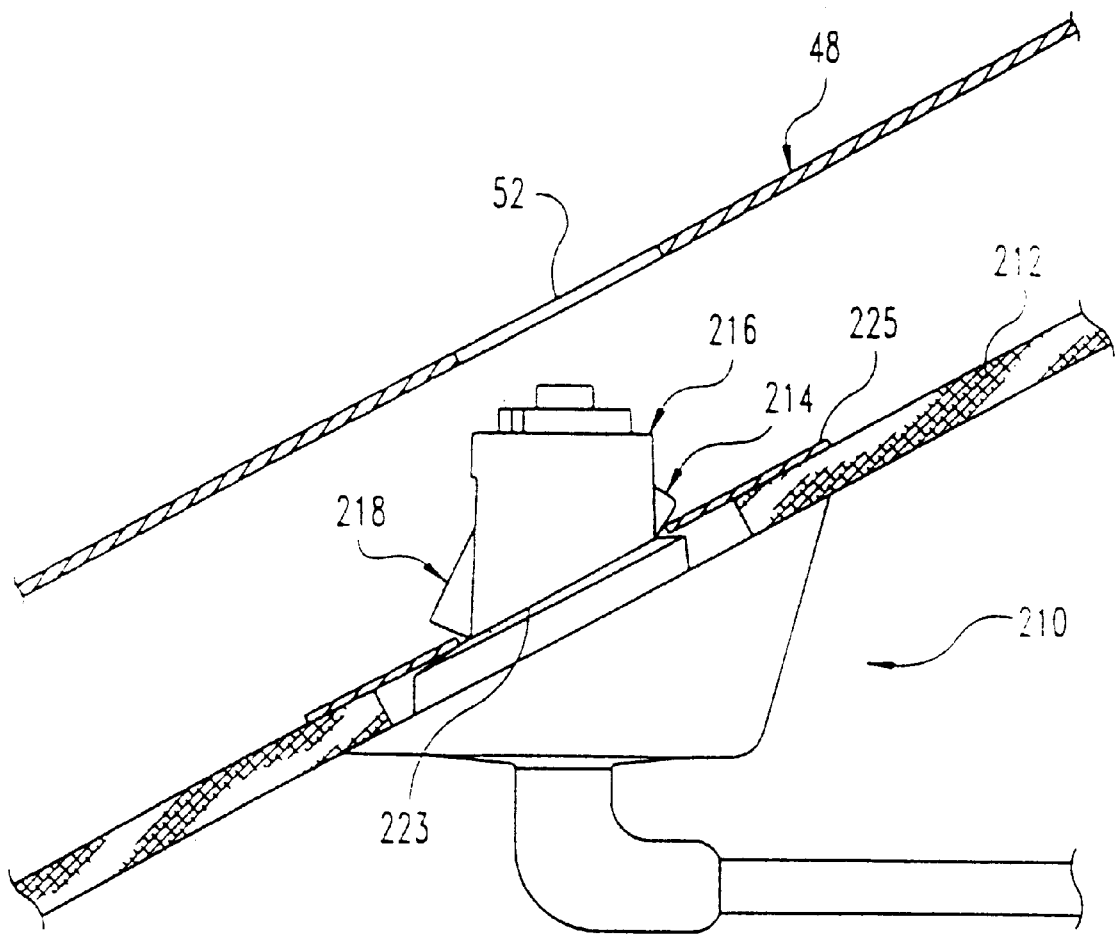
FIG. 22 is a diagrammatic front view of an alternate mounting assembly of the present invention which forms part of a modular headliner system.

Referring now to FIG. 22, there is shown an additional embodiment of a mounting assembly of the present invention which is integrated into a modular headliner system. Mounting assembly 210 is adapted for off-line installation to a modular headliner, which is shown at 212. The mounting assembly 210 is identical to mounting assembly 35, except for a fixed catch 84 being replaced with a resilient locking arm 214 extending from the inner bracket through an opening in the outer bracket 216. Locking arm 218 is identical to locking arm 102 of the mounting assembly of FIG. 2. An annular adapter or backing plate 225, made of a rigid sheet of material such as plastic, includes an opening which corresponds in shape and size to panel aperture 52. During the off-line installation, the distal end of mounting assembly 210 is inserted through an opening in headliner 212 and through the opening of the adapter plate 225. Adapter plate 225 is captured between the catch surfaces of the locking arms 214 and 218 and the beveled shoulder 223 of outer bracket 216 to loosely hold the headliner against the outer bracket skirt so the headliner and mounting assembly 210 can be handled as a unit. At a later stage of assembly when the headliner attached mounting assembly 210 is attached to the appropriately apertured sheet metal roof 48 in the manner described with respect to mounting assembly 35, panel 48 is directly engaged by the catch surfaces of locking arms 214 and 218, and indirectly engaged by beveled shoulder 223 due to the presence of adapter plate 225 therebetween.

Figure 27:
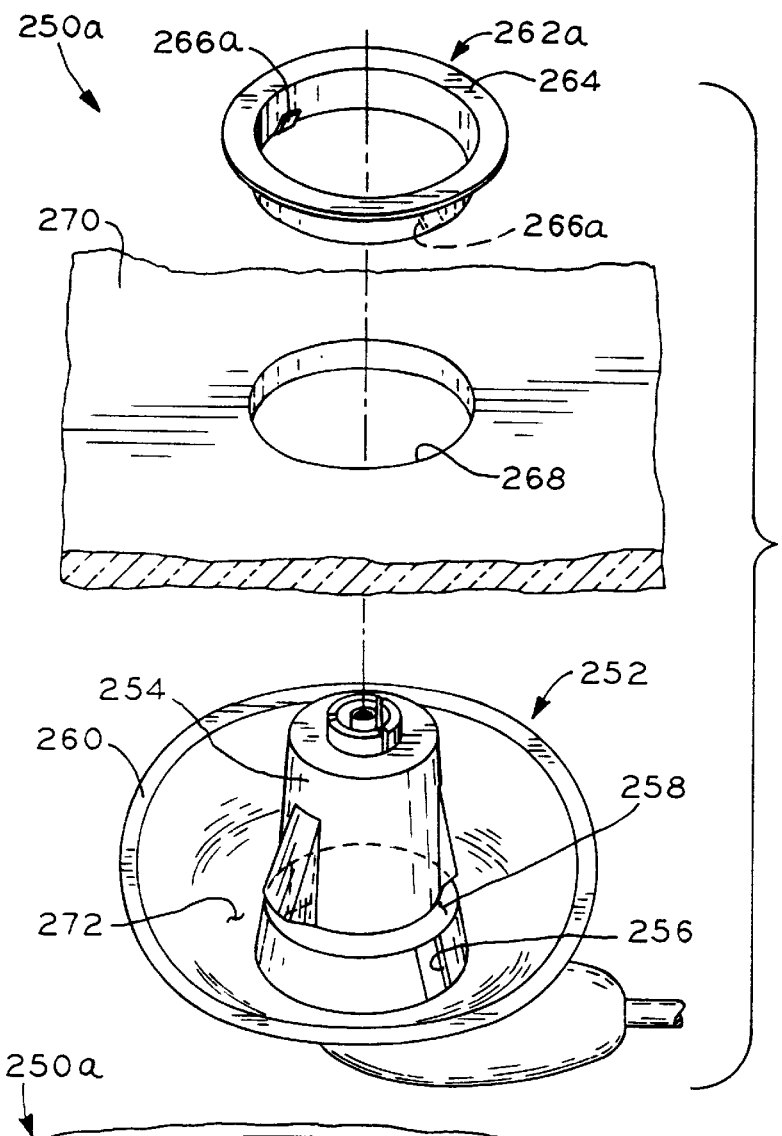
FIG. 27 is an exploded view of another mounting assembly of the present invention, a headliner, and a first locking ring.
Figure 28:
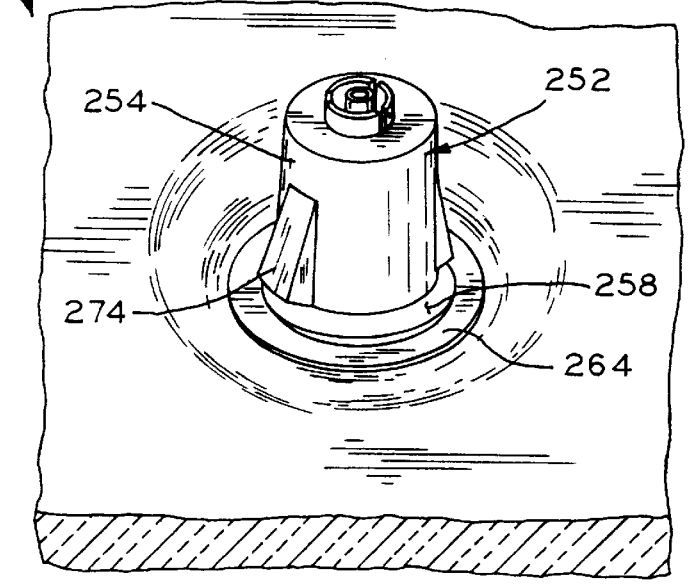
FIG. 28 is a partial perspective view of the mounting assembly of FIG. 27, showing the headliner attached thereto by the first locking ring.

Referring to FIGS. 27–34, there are shown additional embodiments of mounting assemblies which are integrated into a modular headliner system. Mounting assembly 250*a*, shown in FIGS. 27 and 28, includes outer bracket 252 having tower portion 254 with a pair of openings 256 in the base of tower portion 254, and annular ramp surface 258 disposed above openings 256. Locking ring 262*a* is a separate component from outer bracket 252, and includes upper flange 264 and a pair of catch hooks 266*a* at the base thereof which are adapted to engage openings 256 in tower portion 254 of outer bracket 252. As shown in FIG. 27, mounting assembly 250*a* is first inserted into opening 268 of headliner 270 such that headliner 270 rests against base 272 of skirt portion 260 of outer bracket 252. Then, locking ring 262*a* is pressed downwardly around tower portion 254 and between tower portion 254 and headliner 270 such that catch hooks 266*a* engage openings 256 in tower portion 254, thereby capturing headliner 270 between base 272 of skirt portion 260 of outer bracket 252 and upper flange 264 of locking ring 262*a*, wherein headliner may be stretched slightly into skirt portion 260 as shown in FIG. 28. As may be seen in FIG. 28, locking ring 262*a* is pressed downwardly onto tower portion 254 such that upper flange 264 of locking ring 262*a* is disposed below ramp surface 258 of tower portion 254. Therefore, locking ring 262*a* does not interfere with the subsequent attachment of mounting assembly 250*a* to a panel (not shown), wherein the panel is disposed between locking arms 274 of mounting assembly 250*a* and ramp surface 258 of tower portion 254.

Mounting assembly 250*b*, shown in FIGS. 29 and 30, is similar to mounting assembly 250*a*, except that mounting assembly 250*b* includes locking ring 262*b*. Locking ring 262*b* includes lower flange 276, and at least one expansion locking arm 278. As shown in FIGS. 29 and 30, locking ring 262*b* includes three locking arms 278, however, the number of locking arms 278 thereof may be varied. Locking arms 278 include legs 280, base portions 282, and hypotenuse portions 284, with base portions 282 attached to locking ring 262*b* at hinge 286*a* and to hypotenuse portions 284 at hinge 286*b*, and hypotenuse portions 284 attached to legs 280 at hinge 286*c*. Locking ring 262*b* additionally includes one or more catch hooks 266*b*, similar to catch hooks 266*a* of locking ring 262*a*.

As shown in FIG. 29, locking ring 262*b* is first pressed downwardly around tower portion 254 of outer bracket 252 such that catch hooks 266*b* of locking ring 262*b* engage openings 256 in tower portion 254, with legs 280 of locking arms 278 abutting base 272 of skirt portion 260 of outer bracket 252 such that lower flange 276 of locking ring 262*b* is axially spaced from base 272 of skirt 260. Mounting assembly 250*b*, including locking ring 262*b*, is then inserted through opening 268 in headliner 270 until headliner 270 abuts lower flange 276 of locking ring 262*b*. Thereafter, headliner 270 and locking ring 262*b* are pressed further downward, causing legs 280 to shift upwardly and to bend hypotenuse portions 284 and base portions 282 of locking arms 278 outwardly about hinges 286*a–c*. As locking ring 262*b* is thus pressed further downward, catch hooks may 266*b* slide downwardly within openings 256 in tower portion 254.

When locking ring 262*b* is pressed to its furthest downward position, shown in FIG. 30, lower flange 276 thereof abuts base 272 of skirt portion 260, and base and hypotenuse portions 282, 284 of locking arms 278 are folded outwardly such that legs 280, base 282, and hypotenuse portions 284 define a right triangle therebetween, and headliner 270 is captured between lower flange 276 of locking ring 262*b* and base portions 282 of locking arms 278. Further, as shown in FIG. 30, locking ring 262*b*, when pressed to its furthest downward position, is disposed below ramped surface 258 of tower 254, and locking arms 278 are radially spaced away from resilient locking arms 274 of mounting assembly 250*b*, such that mounting assembly 250*b* may be later secured to a panel (not shown), with the panel disposed between resilient locking arms 274 and both ramped surface 258 of tower 254 and the top portions of the folded locking arms 278.

Figure 31:
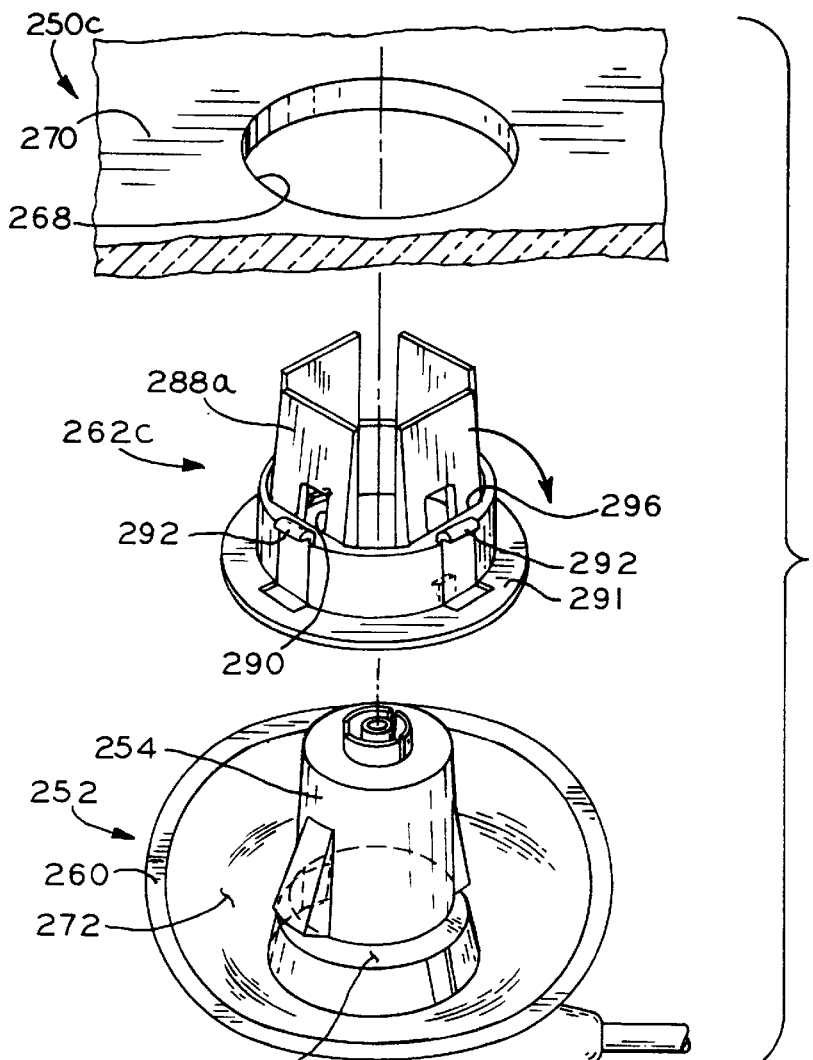
FIG. 31 is an exploded view of another mounting assembly of the present invention, a headliner, and a third locking ring.
Figure 32:
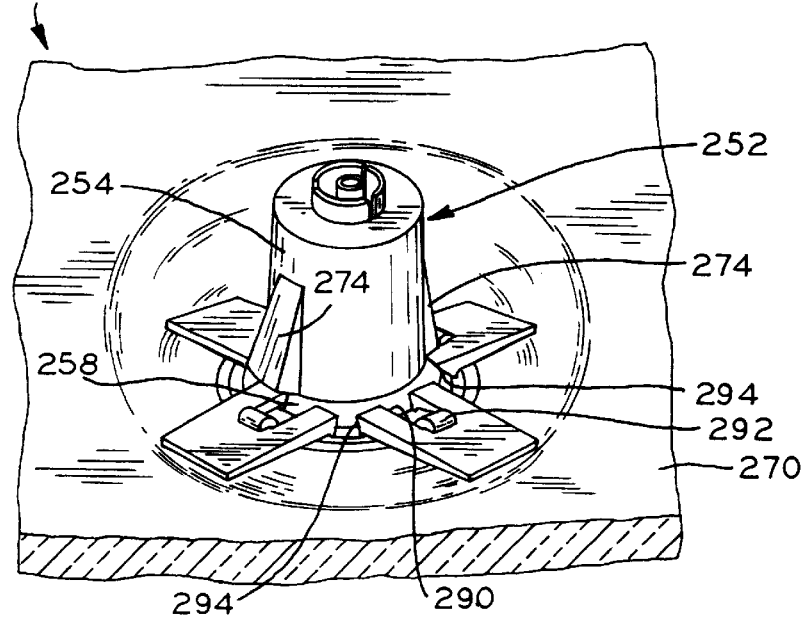
FIG. 32 is a partial perspective view of the mounting assembly of FIG. 31, showing the headliner attached thereto by the third locking ring.

Mounting assembly 250*c* is shown in FIGS. 31 and 32, which is similar to mounting assemblies 250*a–b*, except that mounting assembly 250*c* includes locking ring 262*c*. Locking ring 262*c* includes at least one lever arm 288*a* pivotally connected thereto at hinge 296, lever arms 288*a* each including openings 290 therein. Locking ring 262*c* additionally includes lower flange 291 and a plurality of catch hooks 292 extending from locking ring 262*c* adjacent openings 290 of lever arms 288*a*.

As shown in FIG. 31, locking ring 262*c* is pressed downwardly around tower portion 254 of outer bracket 252 such that contact portions 294 of lever arms 288*a* rest against ramped surface 258 of tower portion 254, with lower flange 291 of locking ring 262*c* spaced from base 272 of skirt 260. Thereafter, mounting assembly 250*c* is inserted through opening 268 in headliner 270 such that headliner 270 abuts lower flange 291 of locking ring 262*c*. When headliner 270 and locking ring 262*c* are pressed further downwardly as shown in FIG. 32, engagement between contact portions 294 of lever arms 288*a* and ramped surface 258 of tower portion 254 cause lever arms 288*a* to rotate outwardly about hinges 296 until catch hooks 292 of locking ring 262*c* engage openings 290 in lever arms 288*a* to lock lever arms 288*a* in the horizontal position shown in FIG. 32. In the position shown in FIG. 32, lower flange 291 of locking ring 262*c* abuts base 272 of skirt portion 260 of outer bracket 252, and headliner 270 is captured between lower flange 291 of locking ring 262*c* and lever arms 288*a*, wherein the engagement between catch hooks 292 of locking ring 262*c* and openings 290 in lever arms 288*a* prevent lever arms 262*c* from pivoting back to the position shown in FIG. 31. Locking ring 262*c* is pressed downwardly around tower portion 254 to an extent where there is sufficient clearance between lever arms 288*a* and resilient locking arms 274 of mounting assembly 250*c* to secure mounting assembly 250*c* to a panel (not shown), with the panel disposed between lever arms 288*a* and resilient locking arms 274 of mounting assembly 250*c*.

Figure 33:
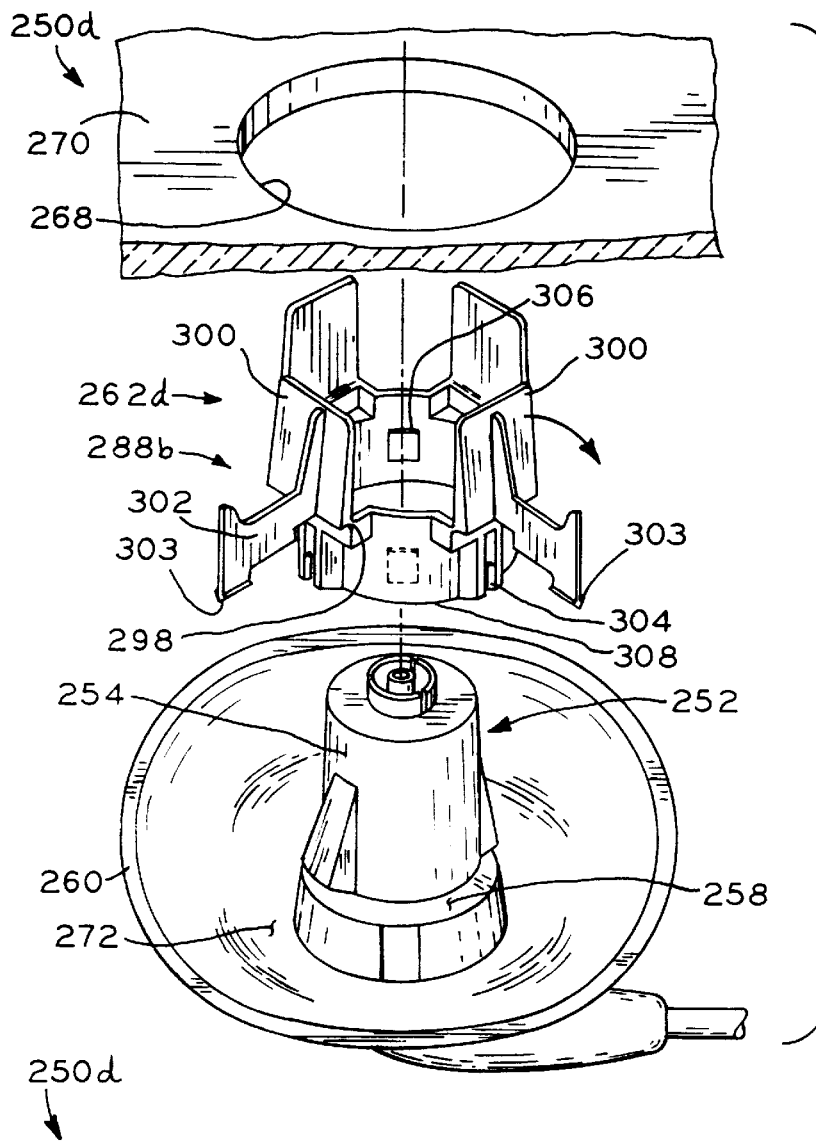
FIG. 33 is an exploded view of another mounting assembly of the present invention, a headliner, and a fourth locking ring.
Figure 34:
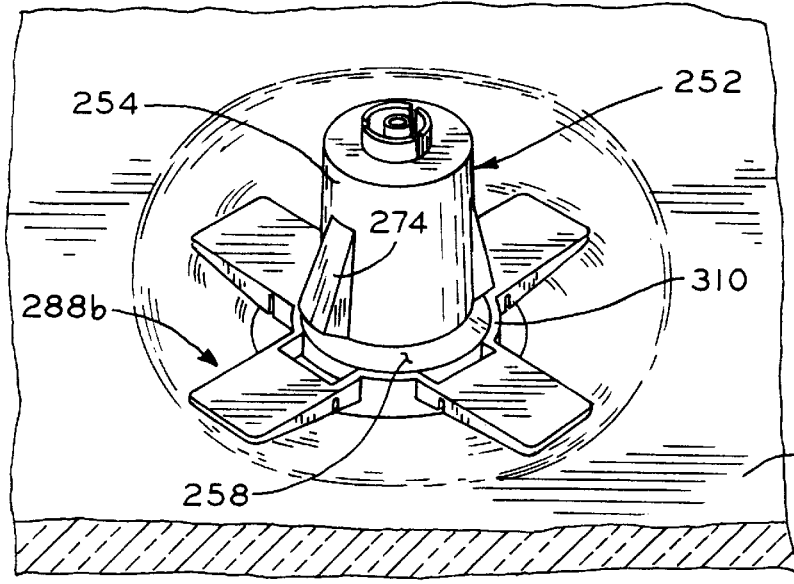
FIG. 34 is a partial perspective view of the mounting assembly of FIG. 33, showing the headliner attached thereto by the fourth locking ring.

Mounting assembly 250*d*, shown in FIGS. 33 and 34, is similar to mounting assemblies 250*a–c*, except that mounting assembly 250*d* includes locking ring 262*d* having at least one lever arm 288*b* pivotally attached thereto at hinge 298. Lever arms 288*b* including top plate 300, arm portions 302, and locking tabs 303 which are lockingly received in vertical grooves 304 fonned in locking ring 262*d*. Locking ring 262*d* may additionally include catch hooks 306, similar to catch hooks 266*a–b* of locking rings 262*a–b*. As shown in FIG. 33, locking ring 262*d* is first pressed downwardly around tower portion 254 of outer bracket 252 such that lower edge 308 of locking ring 262*d* abuts base 272 of skirt 260 of outer bracket 252. Thereafter, mounting assembly 250*d* is inserted through opening 268 in headliner 270, such that headliner 270 contacts arm portions 302 of lever arms 288*b* to rotate same about hinges 298, until locking tabs 303 of lever arms 288*b* are lockingly received within grooves 304 of locking ring 262*d*, thereby capturing headliner 270 between base 272 of skirt 260 and top plates 300 of lever arms 288*b*.

As shown in FIG. 34, top edge 310 of locking ring 262*d* is disposed beneath ramp surface 258 of tower portion 254, such that sufficient clearance remains between ramped surface 258 of tower portion 254 and lever arms 288b to allow mounting assembly 250d to be connected to a panel, with the panel disposed between ramped surface 258 of tower portion 254 and lever arms 288b.

Figure 37:
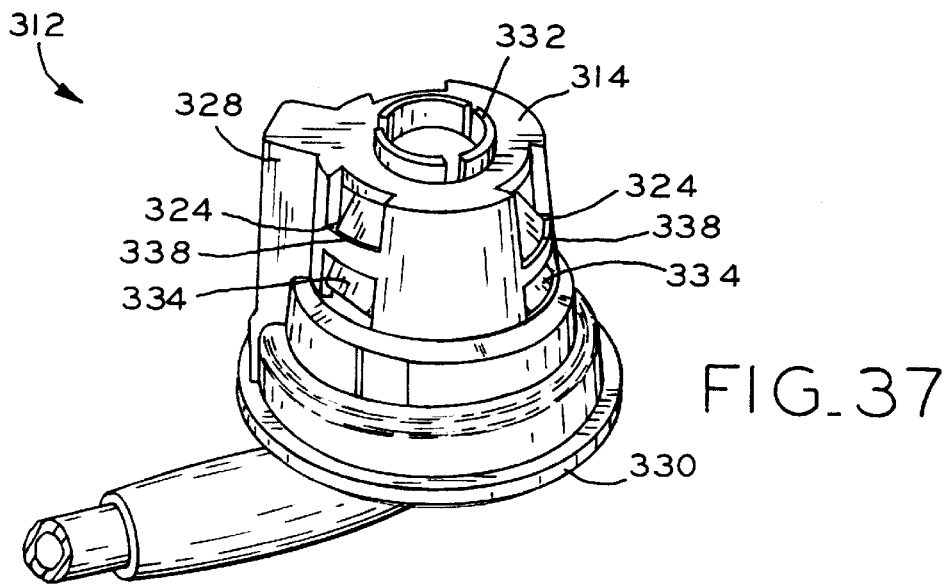
FIG. 37 is a partial perspective view of the mounting assembly of FIG. 36, with the locking arms of the inner bracket thereof shown retracted such that the mounting assembly may be removed from the panel of FIG. 36.

Additional embodiments of mounting assemblies in accordance with the present invention are shown in FIGS. 35–42. Mounting assembly 312 is shown in FIGS. 35–37, which includes outer bracket 314 having a pair of openings 316 therein, a plurality of first catch slots 318 and second catch slots 320 having first catch ledges 322 and second catch ledges 324, respectively. Outer bracket 314 also includes opening 326 in the top thereof, and key portion 328. Additionally, outer bracket 314 includes skirt portion 330, similar to that of the embodiments of FIGS. 2–20, which has been mostly omitted from FIGS. 35 and 36 for clarity. Inner bracket 332 is disposed within outer bracket 314, and includes a plurality of locking arms 334 having primary catches 336, and secondary catches 338 disposed above first catches 336. Elbow 340 is disposed within inner bracket 332, and the elbow and inner bracket subassembly is inserted into outer bracket 314 as described above with reference to the embodiments of FIGS. 2–20.

Locking ring 342, including a pair of catch hooks 344 and key slot 346, is pressed downwardly around tower portion 348 of outer bracket 314 until catch hooks 344 engage openings 316 in tower portion 348 to capture headliner 350 between upper flange 352 of locking ring 342 and skirt portion 330 of outer bracket 314, thereby forming a visor mounting and headliner subassembly. Thereafter, as shown in FIG. 36, mounting assembly 312 may be inserted through opening 354 in panel 48 of a vehicle, with key portion 328 of outer bracket 314 fitting through keyhole slot 356 in panel 48 to prevent relative rotation between mounting assembly 312 and panel 48. Panel 48 is locked between locking arms 334 of inner bracket 332 and ramped surface 358 of outer bracket 314 to attach mounting assembly 312 to panel 48.

Mounting assembly 314 additionally includes a release catch between outer bracket 314 and inner bracket 332 (not shown) substantially identical to that shown in FIG. 12, whereupon when the release catch is disengaged, elbow 340 and inner bracket 332 may be shifted upwardly within outer bracket 314 to the position shown in FIG. 37, such that the engagement between locking arms 334 and tower portion 348 of outer bracket 314 retracts locking arms 334, and secondary catches 338 of locking arms 334 engage second catch ledges 324 to retain locking arms 334 in a retracted position, allowing mounting assembly 312 to be removed from opening 354 of panel 48 (FIG. 36).

Figure 38:
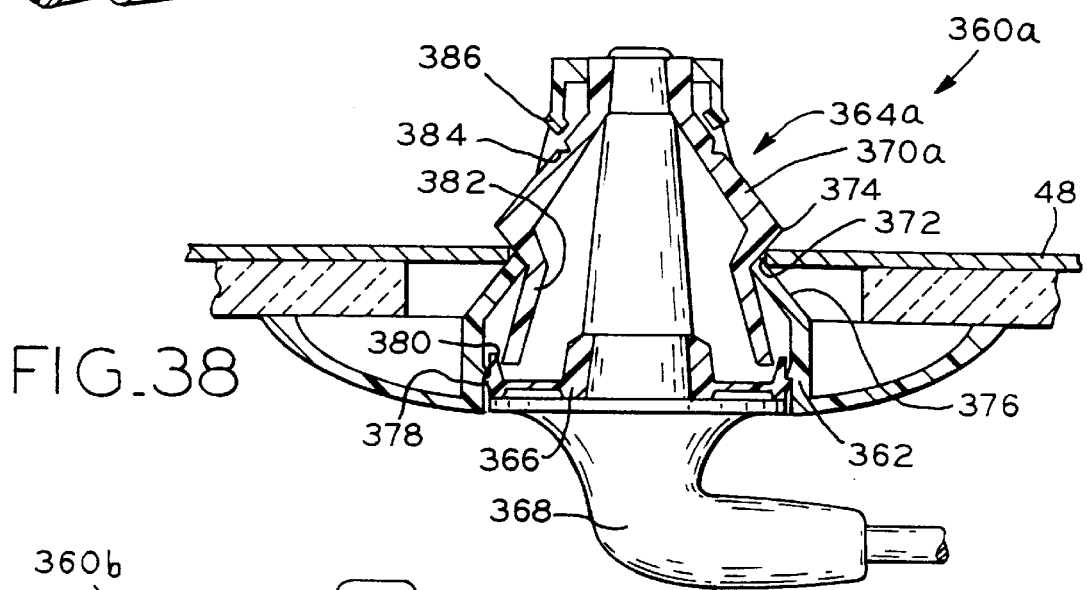
FIG. 38 is a sectional view of another mounting assembly of the present invention, showing the outer bracket, elbow, locking disk, and clip with locking arms.

Mounting assembly 360a, shown in FIG. 38, is a four component assembly, and includes outer bracket 362, clip 364a, locking disk 366, and elbow 368. Mounting assembly 360a additionally includes release catches, described below, between outer bracket and locking disk 366, substantially identical to that shown in FIG. 12, which prevent locking disk 366 from being pressed further upwardly within outer bracket 362. Locking arms 370a of clip 364a are biased inwardly by engagement with opening 372 of panel 48, whereupon clearing opening 372, locking arms 370a return to their original position to capture panel 48 between primary catches 374 of locking arms 370a and ramped surface 376 of outer bracket 362. Locking disk 366 additionally includes catches 378 thereon which engage corresponding catches 380 of outer bracket 362 to prevent locking disk 366 from being pushed upwardly within outer bracket 362. Upon disengagement of release catches 378, 380, elbow 368, locking disk 366, and clip 364a may be shifted axially upwardly within outer bracket 362 such that lower portions 382 of locking arms 370a engage the interior of ramped surface 376 of outer bracket 362 to retract locking arms 370a, and secondary catches 384 of locking arms 370a lockingly engage upper catches 386 of outer bracket 362 to secure locking arms 370a in a retracted position, wherein mounting assembly 360a may be withdrawn from panel 48.

Figure 39:
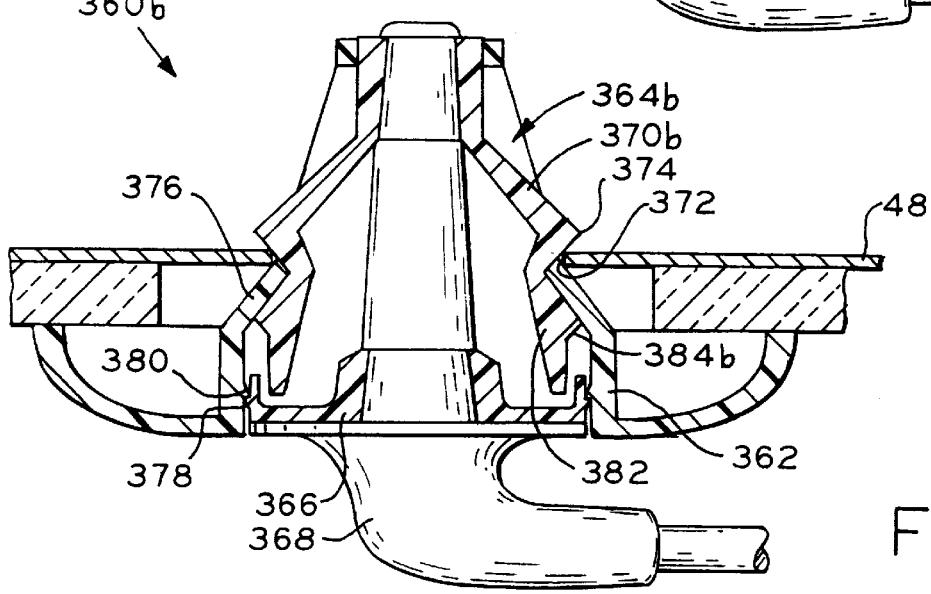
FIG. 39 is a sectional view of another mounting assembly of the present invention, similar to that of FIG. 38.

Mounting assembly 360b shown in FIG. 39, is identical to mounting assembly 360a, except that locking arms 370b of clip 364b thereof includes secondary catches 384b disposed on lower portions 382 of locking arms 370b beneath primary catches 374 of locking arms 370b. Otherwise, the locking operation between mounting assembly 360b and panel 48 is identical to that of mounting assembly 360a.

In each of the embodiments described above, the locking arms of the inner bracket are retracted for disengagement with the panel through the engagement of the locking arms with the outer bracket as the inner bracket is pushed upwardly within the outer bracket. However, the retraction of the locking arms may be also effected as described below.

Figure 40:
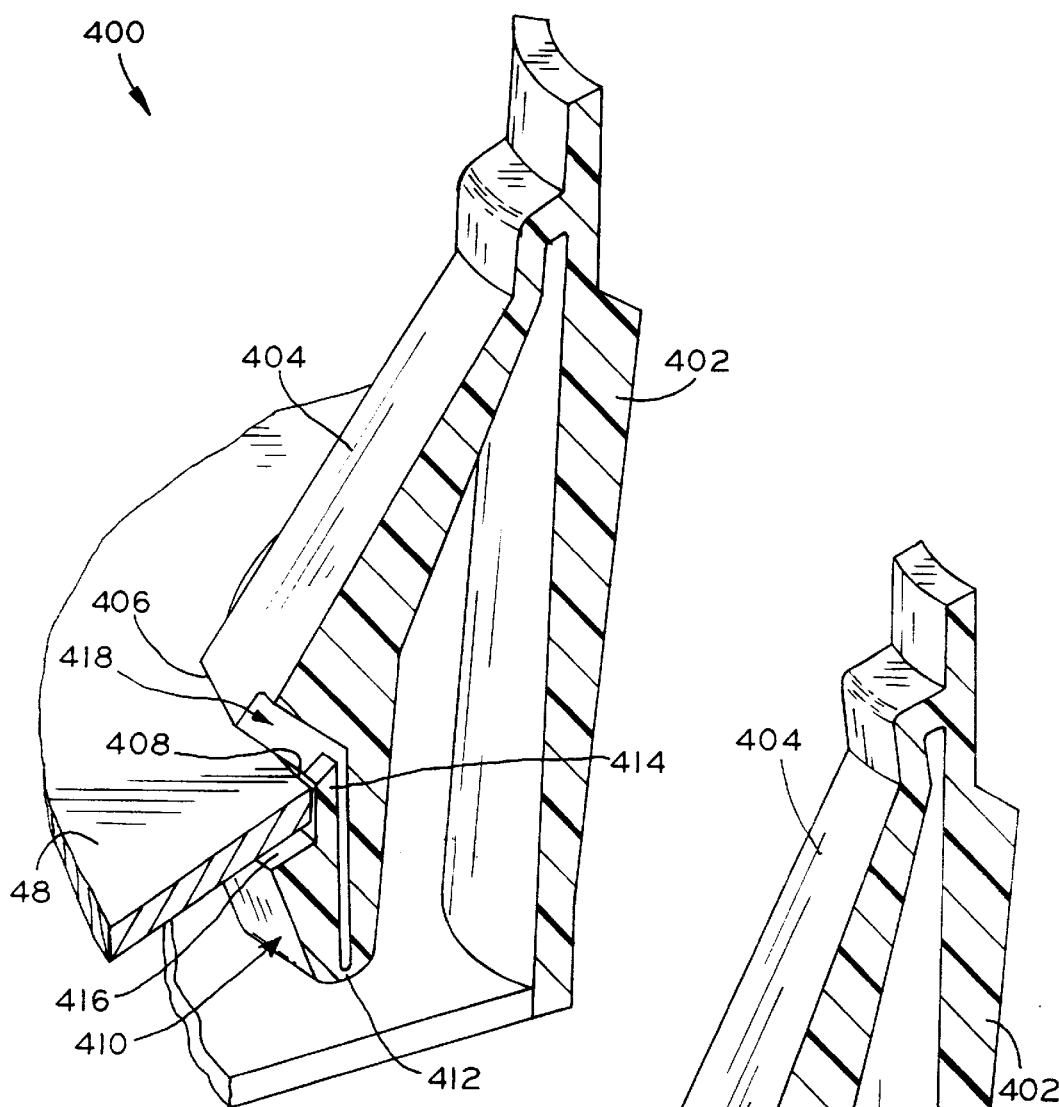
FIG. 40 is a fragmentary sectional view of another mounting assembly of the present invention, showing the locking arm of the inner bracket engaged with a panel with the catch lever of the locking arm in a folded position.
Figure 41:
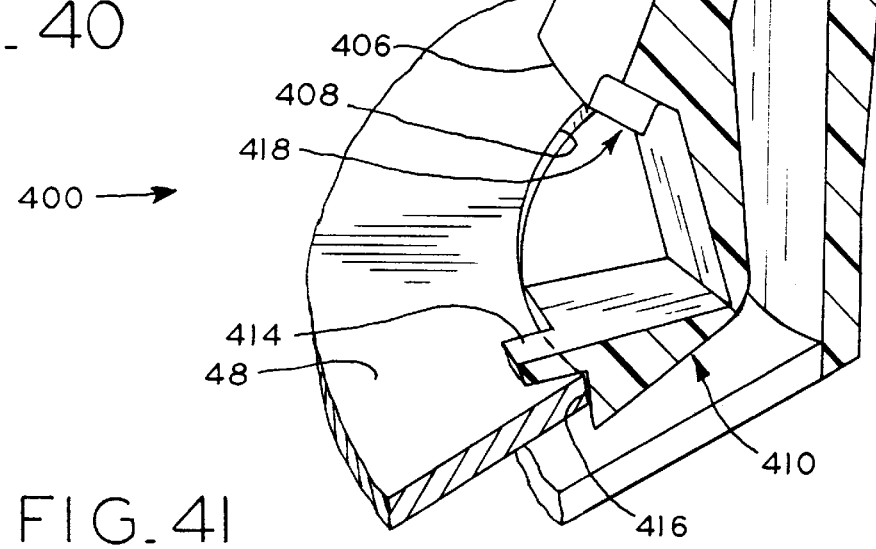
FIG. 41 is a fragmentary sectional view of the mounting assembly of FIG. 40, showing the locking arm of the inner bracket disengaged from the panel with the catch lever of the locking arm in an unfolded position.

For example, mounting assembly 400 is shown in FIGS. 40 and 41, and includes inner bracket 402 having at least one locking arm 404. In FIGS., 40 and 41, the outer bracket and elbow have been omitted for clarity. Locking arm 404 includes primary catch 406, similar to the above-described embodiments, for engagement with opening 408 of panel 48 to attach mounting assembly 400 to panel 48. A lower portion of locking arm 404 is bent back onto itself to form catch lever 410, which may pivot at hinge 412. Catch lever 410 terminates in rib 414 and shelf 416, which are disposed in recess 418 of locking arm 404. As shown in FIG. 40, when mounting assembly 400 is attached to panel 48, the edge of opening 408 of panel 48 is captured between primary catch 406 of locking arm 404 and shelf 416 of catch lever 410, with rib 414 of catch lever abutting the edge of opening 408. As shown in FIG. 41, when inner bracket 402 is pushed axially upwardly, catch lever 410 pivots about hinge 412 to an unfolded position, and engagement between shelf 416 of catch lever 410 and the edge of opening 408 of panel 48 presses catch lever 410 radially inwardly to retract locking arm 404. Locking arm 404 is retained by a secondary catch (not shown), which may be any one of those described above, in the retracted position whereupon mounting assembly 400 may be removed from opening 408 of panel 48, and wherein during such removal, catch lever 410 pivots about hinge 412 back to the position shown in FIG. 40. Thus, in mounting assembly 400, engagement between catch lever 410 of locking arm 404 and panel 48 causes locking arm 404 to retract to a position wherein mounting assembly 400 may be removed from panel 48.

Figure 42:
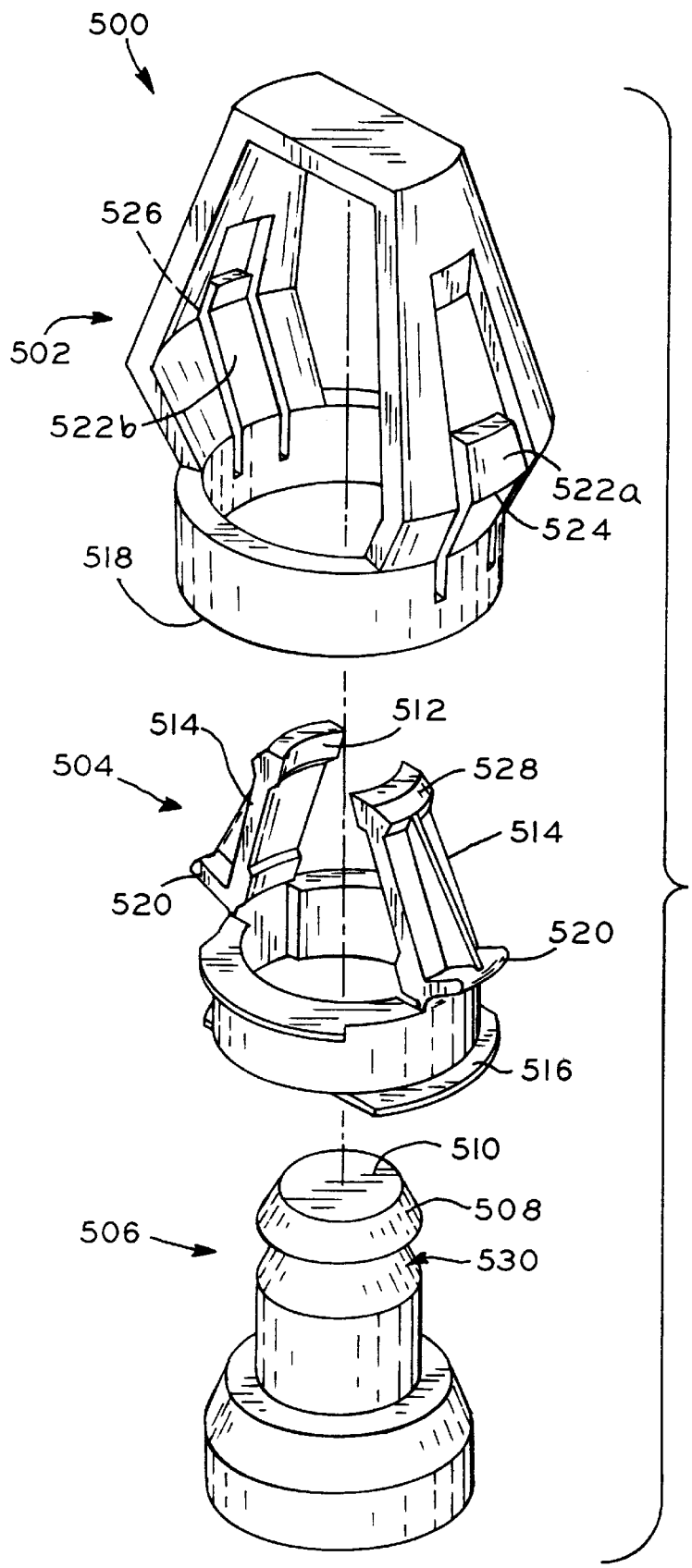
FIG. 42 is an exploded view of another mounting assembly of the present invention, showing the elbow, inner bracket with cam arms, and outer bracket with locking arms.

While the resilient locking arms are shown in previous embodiments as being made part of the inner bracket, in alternate embodiments such arms can be molded as part of the outer bracket and be adapted to be retractable by movement of the inner bracket relative to the outer bracket. For example, munting assembly 500 is shown in FIG. 42, which includes a pair of locking arms formed as part of the outer bracket thereof. Mounting assembly 500 generally includes outer bracket 502, inner bracket 504, and elbow 506. Elbow 506 is pressed axially upwardly into inner bracket 504 until annular ramped surface 508 of head 510 thereof abuts internal ramped surfaces 512 of resilient cam arms 514 of inner bracket 504. Thereafter, the elbow and inner bracket subassembly is inserted into outer bracket 502 until base flange 516 of inner bracket abuts bottom edge 518 of outer bracket 504. Thereafter, further insertion of elbow 506 into inner bracket 504 causes annular ramped surface 508 of head 510 of elbow 506 to press cam arms 514 radially outward, and cams 520 of cam arms 514 in turn press resilient locking arms 522a, 522b radially outward to engage catches 524, 526 thereof with a panel (not shown).

A release catch (not shown), similar to that of FIG. 12, may be disposed between elbow 506 and inner bracket 504 to lock elbow 506 in the above-described position in which locking arms 522a, 522b lock mounting assembly 500 to a panel. Upon disengagement of the release catch, elbow 506 is inserted further axially into inner bracket 504 until head 510 of elbow 506 clears end portions 528 of cam arms 514, whereupon end portions 528 of cam arms 514 retract into recess 530 of elbow 506, which in turn retracts locking arms 522a, 522b such that mounting assembly 500 may be removed from the panel.

While this invention has been shown and described as having multiple designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A mounting assembly for mounting a visor to a vehicle panel, said panel having an aperture, a distal surface, and a proximal surface, said assembly comprising:

an elbow adapted to be connected to a visor;

an inner bracket defining a first opening within which said elbow is received, said elbow rotatable within said inner bracket opening about an axis extending in an axial direction of said inner bracket;

an outer bracket defining a second opening within which said inner bracket is received, said outer bracket including at least one surface region for operable engagement with said panel proximal surface, said outer bracket including a third opening; and a first catch and a second catch associated with at least one of said inner bracket and said outer bracket, each of said first and second catches adapted to operably engage a panel distal surface to resist withdrawal of the mounting assembly when installed in the said panel aperture, at least one of said first catch and said second catch comprising a panel catching portion of a locking arm, said panel catching portion radially movable relative to said inner bracket between an extended position and a retracted position, said panel catching portion being biased radially outward through said third opening in said outer bracket toward said extended position at which said panel catching portion and said at least one surface region of said outer bracket axially capture the panel therebetween to hold the mounting assembly in the aperture of the panel.

2. The mounting assembly of claim 1, wherein said locking arm is resilient and is connected to said inner bracket, and wherein said resilient locking arm biases said panel catching portion radially outward toward said extended position.

3. The mounting assembly of claim 1, wherein said at least one surface region of said outer bracket is disposed at an angle relative to said axial direction.

4. The mounting assembly of claim 3, wherein said at least one surface region comprises a shoulder defining a periphery of said outer bracket.

5. The mounting assembly of claim 1, wherein said locking arm is resilient and extends from said inner bracket, and said second catch comprises a panel catching portion of a second resilient locking arm extending from said inner bracket.

6. The mounting assembly of claim 1, wherein said first and second catches are spaced 180° apart.

7. The mounting assembly of claim 1, wherein said inner bracket is movable within said second opening in said axial direction, said locking arm including a ramped region which slides along a portion of said outer bracket when said inner bracket moves in said axial direction relative to said outer bracket, said ramped region structured and arranged to radially shift said panel catching portion from said extended position to said retracted position in response to movement in said axial direction of said inner bracket relative to said outer bracket from a first axial position to a second axial position, wherein said panel catching portion is disengaged from the panel when in said retracted position to allow proximal withdrawal of the mounting assembly from the aperture in the panel.

8. The mounting assembly of claim 7, wherein said locking arm comprises a third catch engagable by said outer bracket portion to retain said locking arm with said panel catching portion in said retracted position.

9. The mounting assembly of claim 7, wherein said outer bracket comprises a third catch engagable by said inner bracket to retain said locking arm with said panel catching portion in said retracted position.

10. The mounting assembly of claim 7, wherein said inner bracket comprises a third catch engagable by said outer bracket to retain said locking arm with said panel catching portion in said retracted position.

11. The mounting assembly of claim 1, wherein said inner bracket is movable within said second opening in said axial direction, said locking arm including a catch lever engaging said panel aperture which pivots about said locking arm when said inner bracket moves in said axial direction relative to said outer bracket, said catch lever structured and arranged to radially shift said panel catching portion from said extended position to said retracted position in response to movement in said axial direction of said inner bracket relative to said outer bracket from a first axial position to a second axial position, wherein said panel catching portion is disengaged from the panel when in said retracted position to allow proximal withdrawal of the mounting assembly from the aperture in the panel.

12. The mounting assembly of claim 1, further comprising a radially extending release catch of said inner bracket axially engagable with an overhang portion of said outer bracket when said inner bracket is disposed in said first axial position, wherein movement of said inner bracket relative to said outer bracket from said first axial position to said second axial position is prevented when said release catch engages said overhang portion.

13. A mounting assembly for mounting a component to a panel, said panel having an aperture, a distal surface, and a proximal surface, comprising:

an inner bracket adapted to be operably attached to the component;

an outer bracket defining a first opening within which said inner bracket is received, said inner bracket being movable within said outer bracket opening in an axial direction between first and second axial positions;

a first catch and a second catch associated with at least one of said inner bracket and said outer bracket, each of said first and second catches adapted to operably engage the panel distal surface when said inner bracket is disposed in said first axial position to resist withdrawal of the mounting assembly when installed in the said panel aperture, at least one of said first catch and said second catch comprising a panel catching portion of a locking arm, said locking arm connected to one of said inner bracket and said outer bracket, the other of said inner bracket and said outer bracket including a ramp engaging surface, said locking arm including a ramped region, said panel catching portion biased radially outward from a retracted position to an extended position;

wherein, when said inner bracket is disposed in said first axial position and said mounting assembly is located in an installation axial position within the panel aperture, said panel catching portion extends beyond the expanse of the panel aperture in said extended arrangement so as to overlay the panel distal surface and resist proximal withdrawal of the mounting assembly; and wherein when said inner bracket is moved relative to said outer bracket from said first axial position to said second axial position, said ramped region slides along said ramp engaging surface to radially shift said panel catching portion from said extended position to said retracted position and wherein said panel catching portion fits through the panel aperture when in said retracted arrangement to allow proximal withdrawal of the mounting assembly from the aperture in the panel.

14. The mounting assembly of claim 13, wherein the component is a vehicle visor, and the mounting assembly further comprises an elbow attachable to the visor, said elbow received within an opening in said inner bracket and rotatable therein about an axis extending in said axial direction.

15. The mounting assembly of claim 13, wherein said outer bracket comprises said ramp engaging surface, and wherein said locking arm comprises a catch engagable by said ramp engaging surface of said outer bracket to retain said locking arm with said panel catching portion in said retracted position.

16. The mounting assembly of claim 13, wherein said outer bracket comprises said ramp engaging surface, and further comprises a catch engagable by said inner bracket to retain said inner bracket in said second axial position with said panel catching portion in said retracted position.

17. The mounting assembly of claim 13, wherein said outer bracket comprises said ramp engaging surface, and said inner bracket comprises a catch engagable by said outer bracket to retain said inner bracket in said second axial position with said panel catching portion in said retracted position.

18. The mounting assembly of claim 13, wherein said ramped region is disposed proximally of said panel catching portion.

19. The mounting assembly of claim 13, wherein said ramped region is disposed distally of said panel catching portion.

20. The mounting assembly of claim 13, wherein said locking arm includes a panel engaging ramp surface structured and arranged to engage the panel and be forced radially inwardly thereby when the mounting assembly is inserted into the panel aperture during installation.

21. The mounting assembly of claim 13, further comprising a radially extending release catch of said inner bracket axially engagable with an overhang portion of said outer bracket when said inner bracket is disposed in said first axial position, wherein movement of said inner bracket relative to said outer bracket from said first axial position to said second axial position is prevented when said release catch engages said overhang portion.

22. A mounting assembly for mounting a vehicle visor to an apertured panel, comprising:

an elbow attachable to the visor;

an inner bracket defining an opening within which said elbow is received, said elbow rotatable within said inner bracket opening about an axis extending in an axial direction;

an outer bracket defining an opening within which is received said inner bracket;

means for attaching the mounting assembly to the panel, said attaching means including at least one resilient locking arm biased to a radially outward position in engagement with the panel; and means for shifting said at least one resilient locking arm from said radially outward position to a radially retracted position responsive to movement in said axial direction of said inner bracket from a first position to a second position relative to said outer bracket, wherein said at least one resilient locking arm is disengaged from the panel when in said radially retracted position to allow withdrawal of the mounting assembly from the apertured panel.

23. The mounting assembly of claim 22, wherein said means for shifting comprises a portion of said outer bracket along which slides a ramped region of said at least one resilient locking arm.

24. The mounting assembly of claim 23, wherein said at least one resilient locking arm comprises a catch engagable by said outer bracket portion to hold said at least one resilient locking arm in said radially retracted position.

25. The mounting assembly of claim 23, wherein said means for shifting comprises a catch lever pivotally connected to each said at least one locking arm, each said catch lever engaging said panel.

26. The mounting assembly of claim 23, further comprising means for preventing unintentional movement of said inner bracket from said first position to said second position relative to said outer bracket.

27. The mounting assembly of claim 26, wherein said means for preventing unintentional movement comprises a radially extending release catch of said inner bracket axially engagable with an overhang portion of said outer bracket.

28. The mounting assembly of claim 27, wherein said release catch radially extends into an axially extending hollow formed by an interior surface of said outer bracket, wherein abutting contact of said release catch with said interior surface within said hollow limits rotational motion of said inner bracket relative to said outer bracket.

29. The mounting assembly of claim 28, wherein said release catch is movable radially inward by a tool insertable through a gap formed between said elbow and said outer bracket.

30. The mounting assembly of claim 23, further comprising means for internally routing wiring leading to the elbow within the mounting assembly through the aperture of the panel.

* * * * *